(12) United States Patent
Qiu et al.

(10) Patent No.: US 7,484,039 B2
(45) Date of Patent: Jan. 27, 2009

(54) METHOD AND APPARATUS FOR IMPLEMENTING A GRID STORAGE SYSTEM

(75) Inventors: Xiaogang Qiu, 1591 Johnson Ave., San Jose, CA (US) 95129; Ningchuan Shen, 1274 Riesling Ter., Sunnyvale, CA (US) 94087

(73) Assignees: Xiaogang Qiu, San Jose, CA (US); Ningchuan Shen, San Jose, CA (US)

( * ) Notice: Subject to any disclaimer, the term of this patent is extended or adjusted under 35 U.S.C. 154(b) by 460 days.

(21) Appl. No.: 11/438,411

(22) Filed: May 22, 2006

(65) Prior Publication Data

US 2006/0277363 A1    Dec. 7, 2006

Related U.S. Application Data

(60) Provisional application No. 60/683,692, filed on May 23, 2005, provisional application No. 60/688,978, filed on Jun. 9, 2005, provisional application No. 60/688,932, filed on Jun. 9, 2005.

(51) Int. Cl.
  *G06F 12/16* (2006.01)
(52) U.S. Cl. .................. 711/114; 711/165; 714/710
(58) Field of Classification Search .............. 714/5, 714/6, 7, 40, 41, 42, 44, 710
  See application file for complete search history.

(56) References Cited

U.S. PATENT DOCUMENTS 7,107,534 B1 * 9/2006 de Jong et al. ............ 715/734
2004/0139167 A1 * 7/2004 Edsall et al. ............. 709/212

OTHER PUBLICATIONS

"Three Challenges in the Implementation of Disk Mirroring", IBM Technical Disclosure Bulletin, Sep. 1, 1990, vol. 33, Issue 4 pp. 14-20.*

* cited by examiner

*Primary Examiner*—Jack A Lane

(57) ABSTRACT

Embodiments of the present invention facilitate implementing external storage systems using commodity computer components to achieve high performance and reliability. An exemplary method facilitates dynamic repairing of disk failures for RAID1 storage coherently across a plurality of loosely coupled storage controller computers via message communications through network interfaces. An exemplary method facilitates snapshot function coherently across a plurality of loosely coupled storage controller nodes via message communications through network interfaces. An exemplary method facilitates to detect, tolerate, and repair temporary target device failures in a networked storage system. An exemplary target device may contain a plurality of disk devices, and a temporary target device failure may due to many reasons such as a network or software glitch.

3 Claims, 18 Drawing Sheets

RAID1 Array Repair

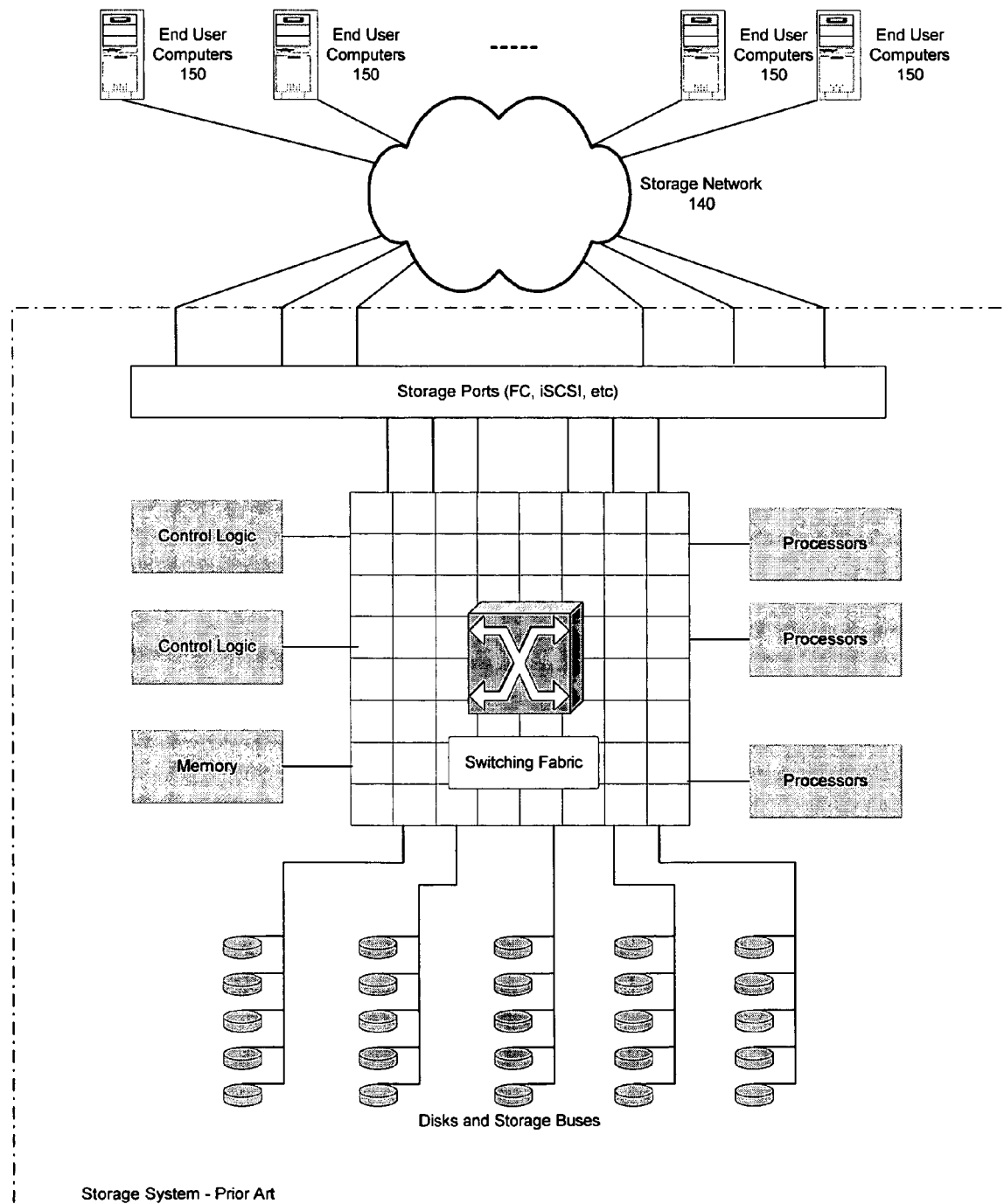
Figure 1. Architecture of A Typical Storage System
(Prior Art)

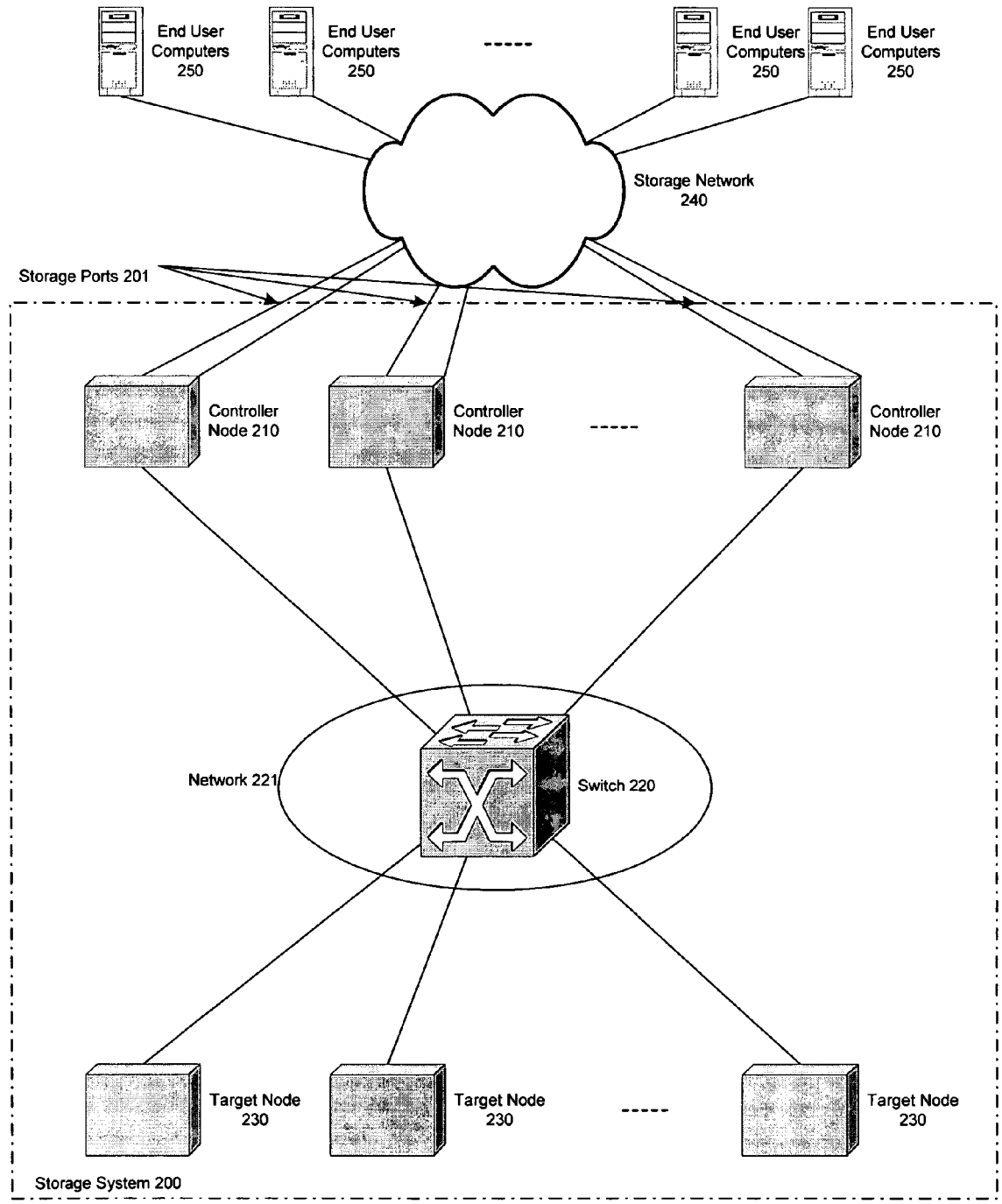
Figure 2. Overview of the Present Storage System

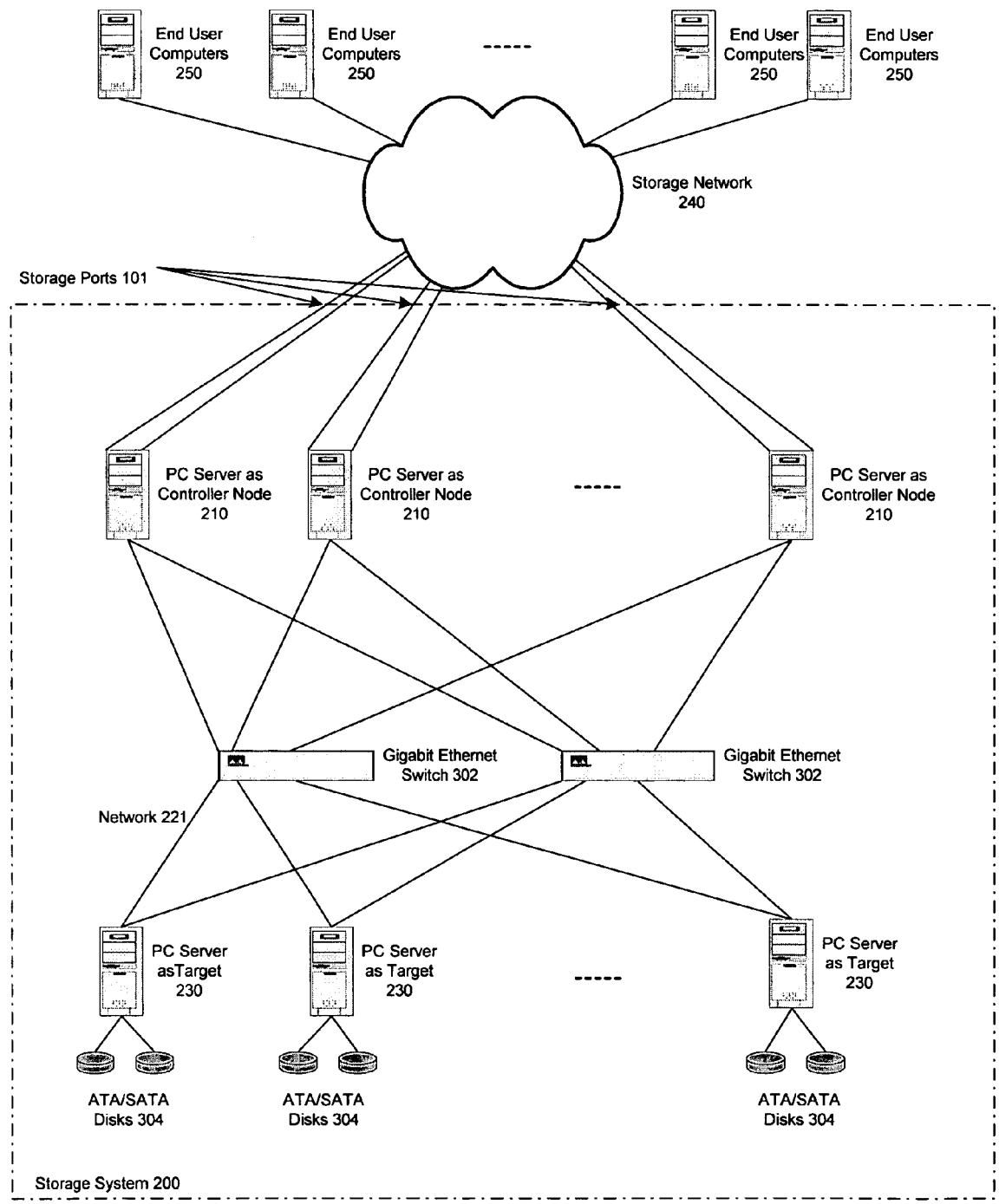
Figure 3. An Example of the Present Storage System

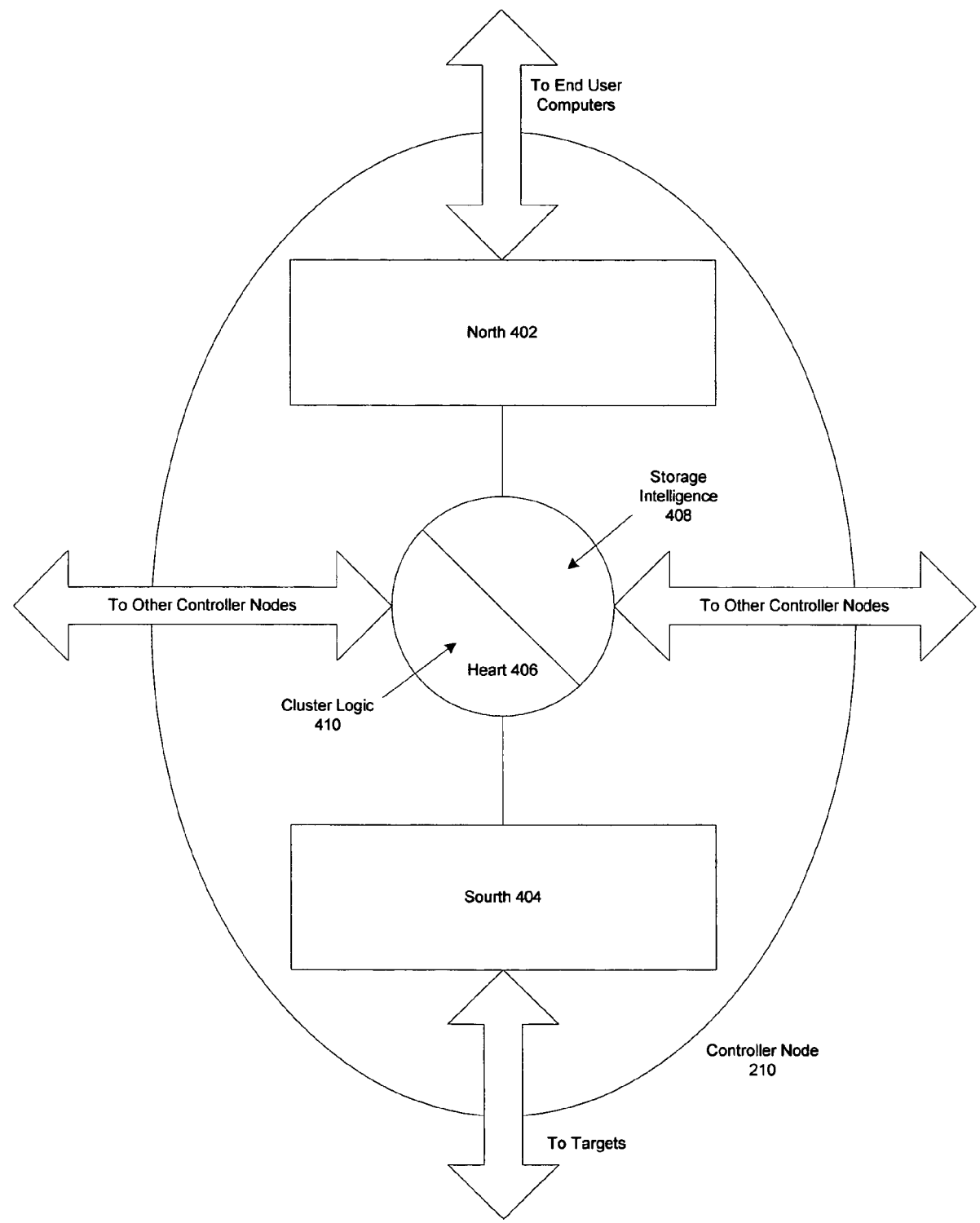
Figure 4. Logical Structure of a Controller Node

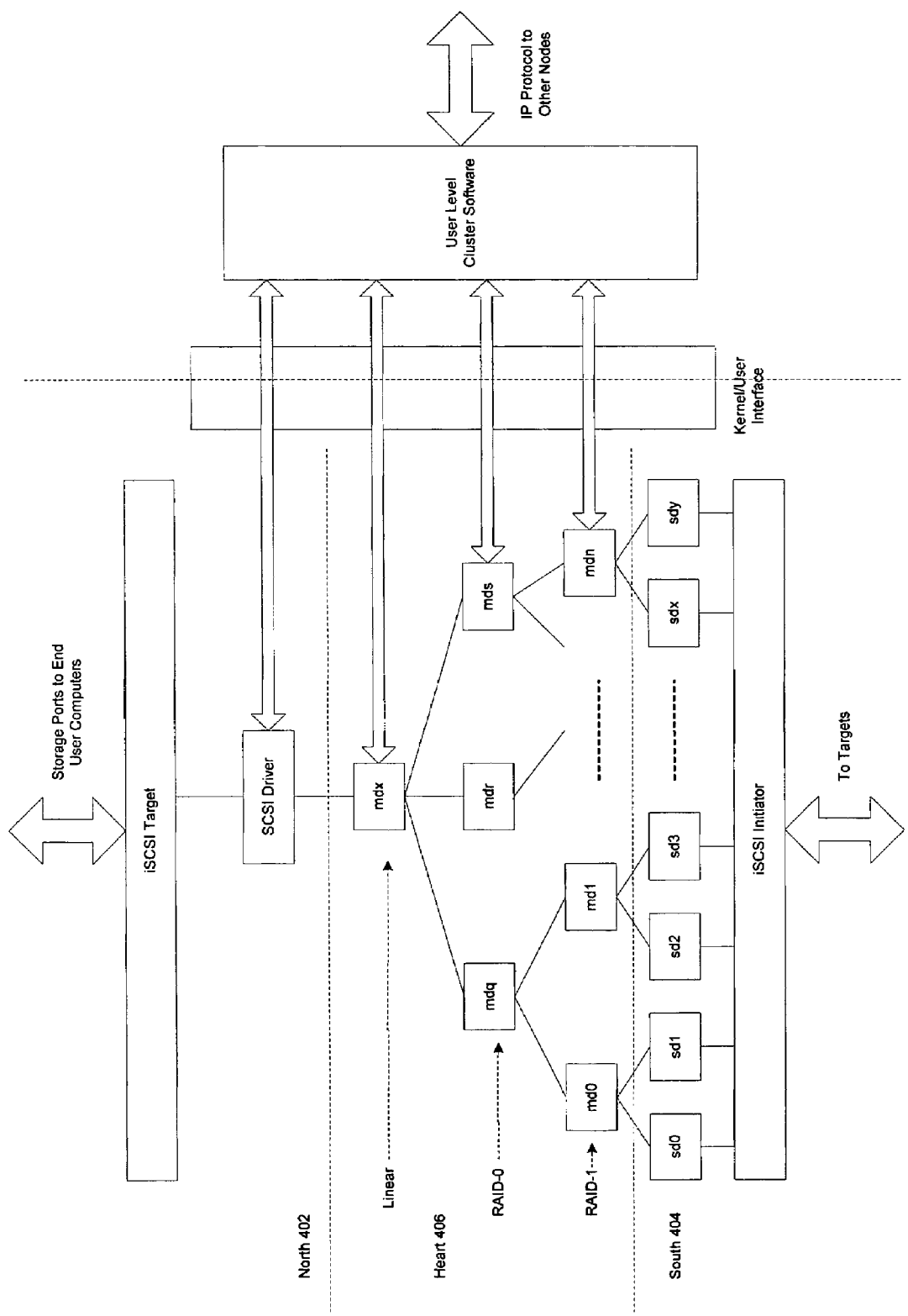
Figure 5. An Example of the Controller Node Implementation on Linux

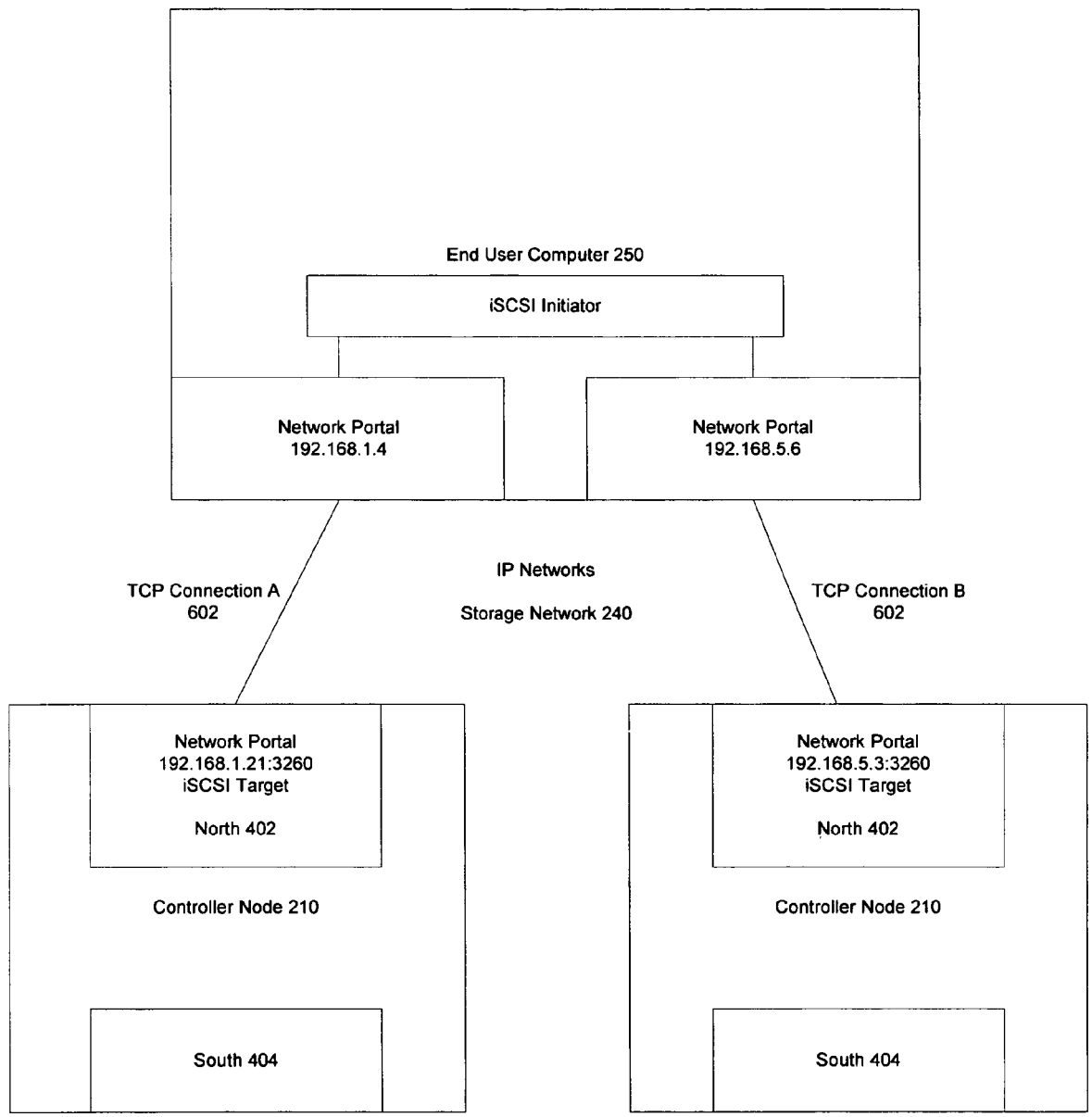
Figure 6. An iSCSI Session with 2 TCP Connections

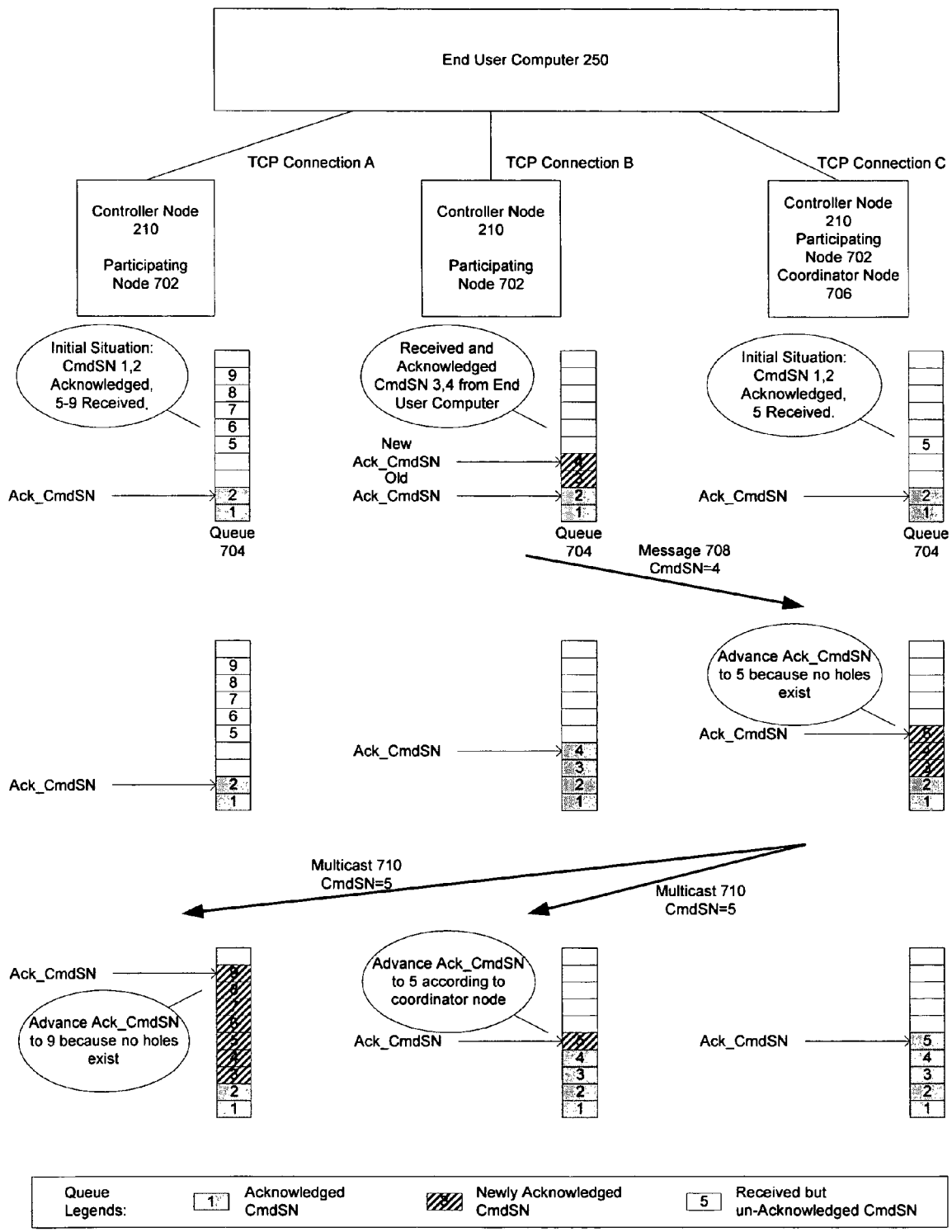
Figure 7. A Method to Handle iSCSI Command Sequence Numbering at Multiple Storage Controller Nodes

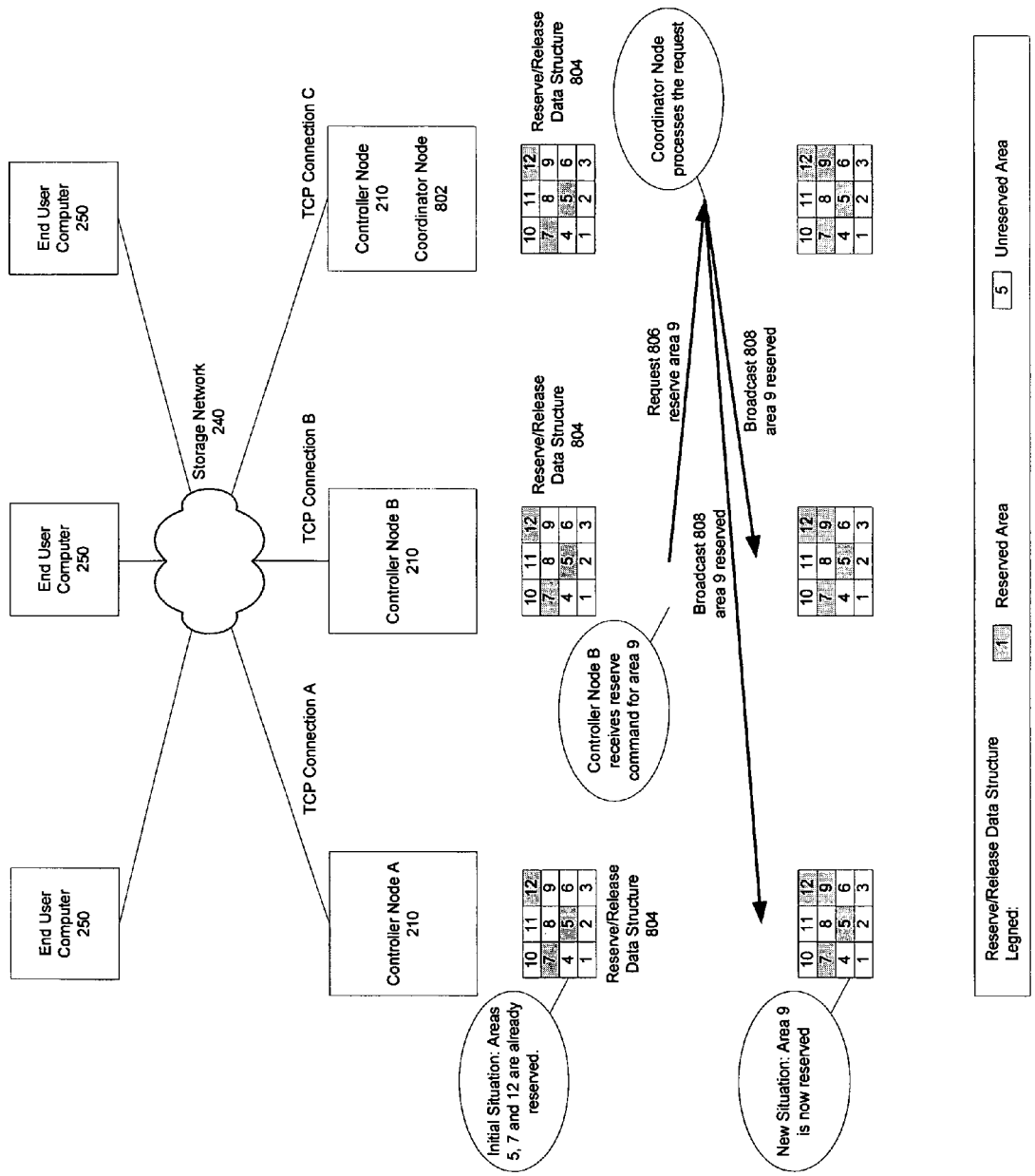
Figure 8. A Method to Handle SCSI Reserve/Release Command at Multiple Storage Controller Nodes

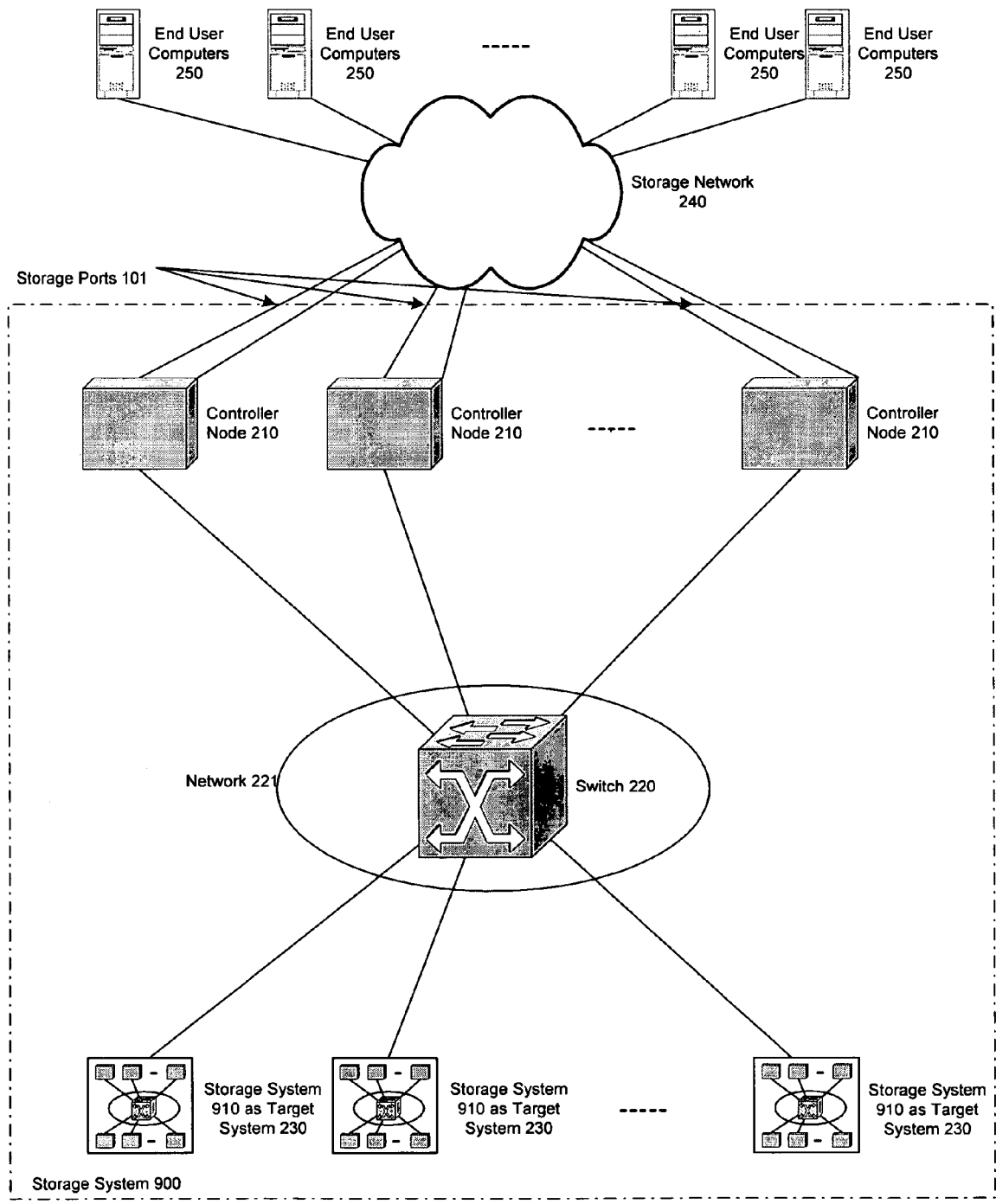
Figure 9. Recursive Construction of the Present Storage System

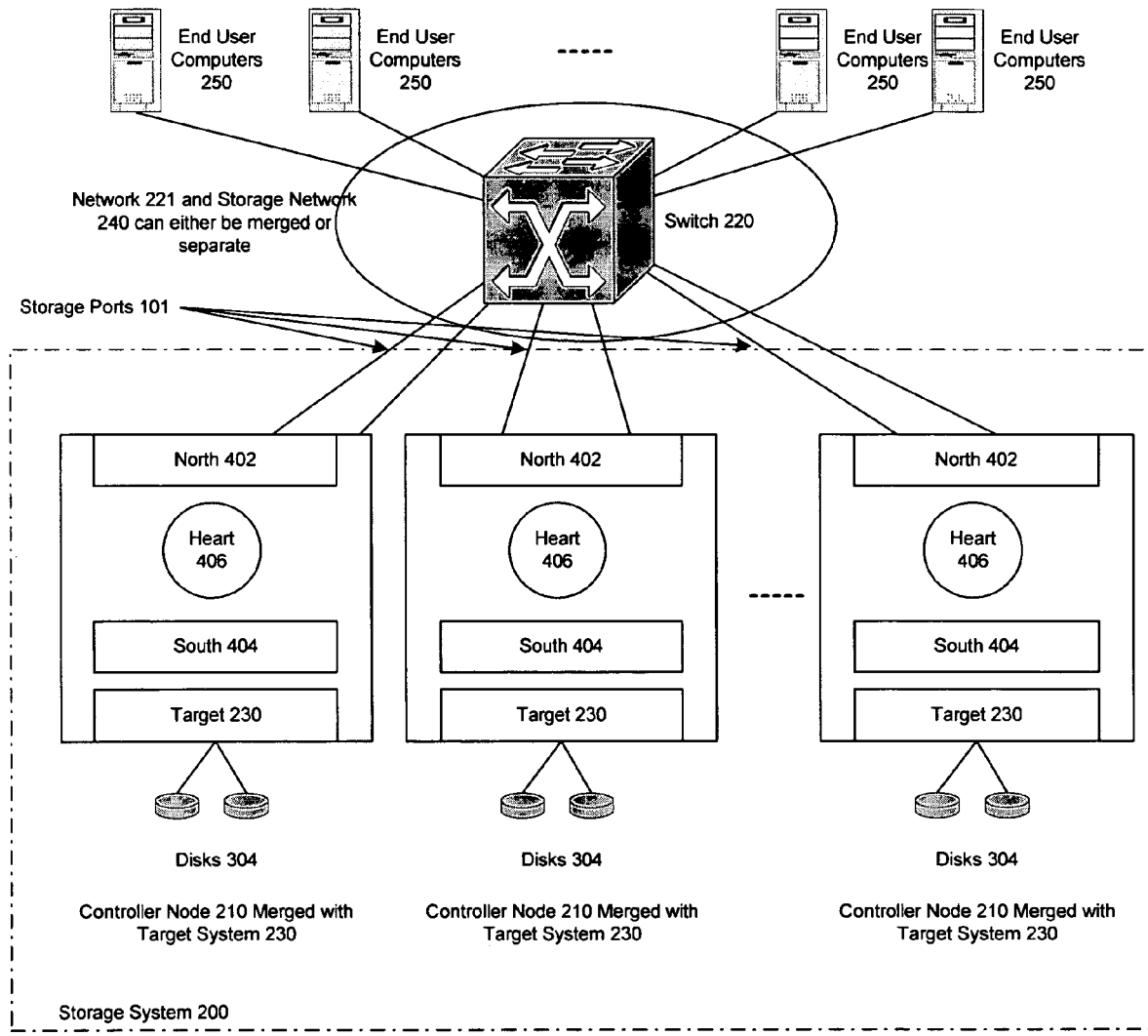
Figure 10. Controller Nodes Merged with Target Nodes

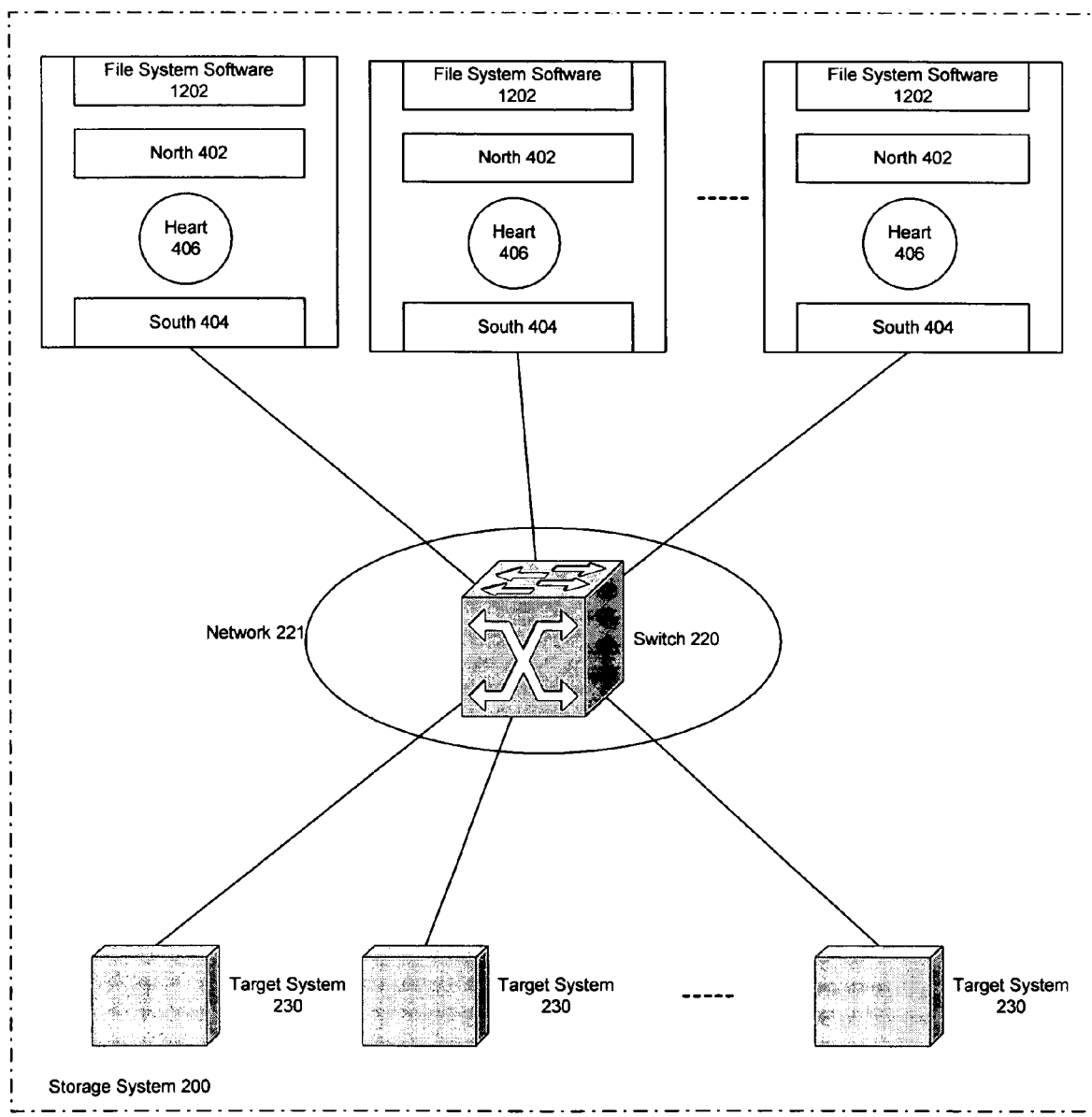
Figure 11. Controller Nodes Merged with End User Compuer

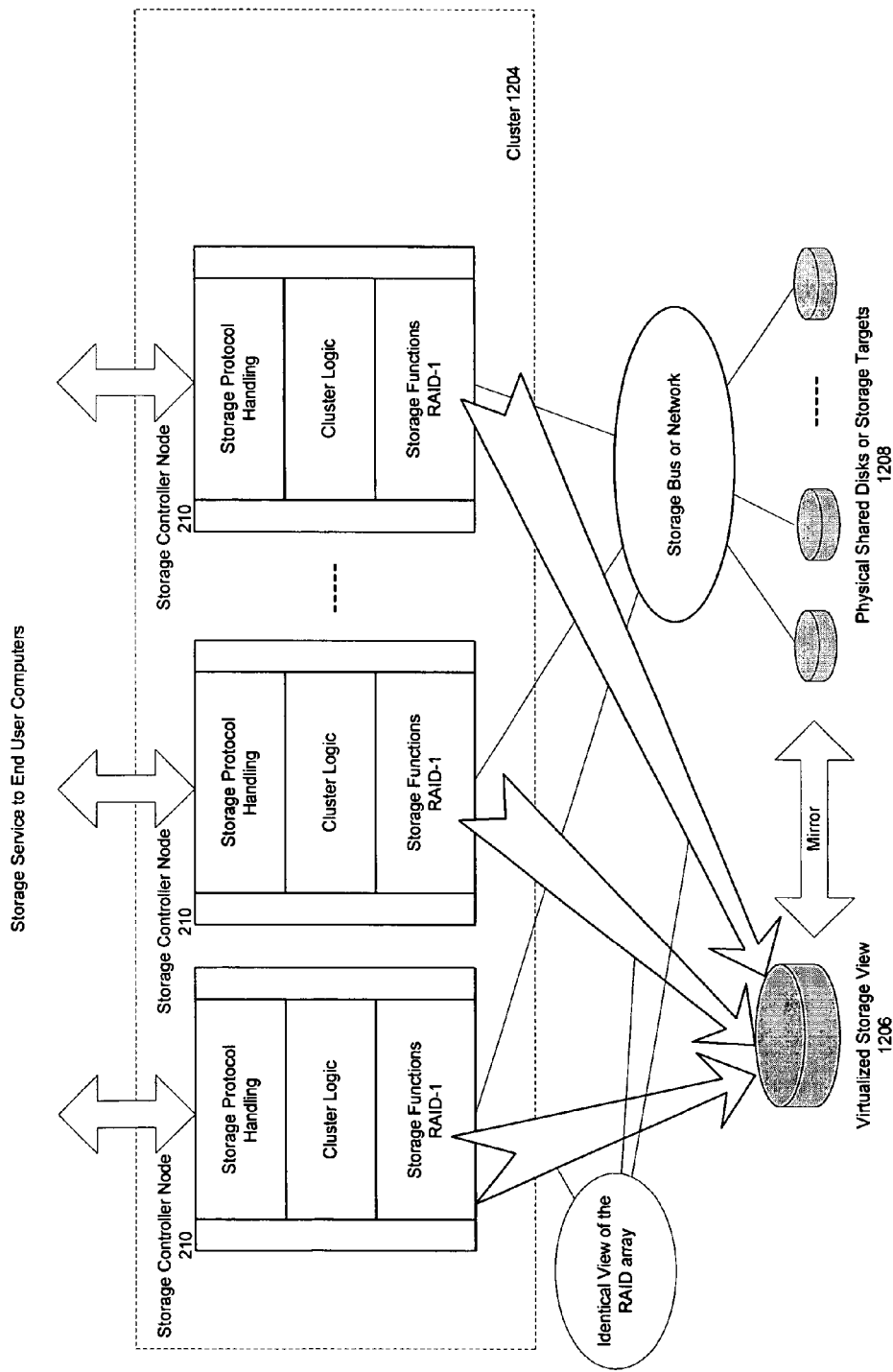
Figure 12. RAID-1 Storage Functions on Cluster of Storage Controller Computers

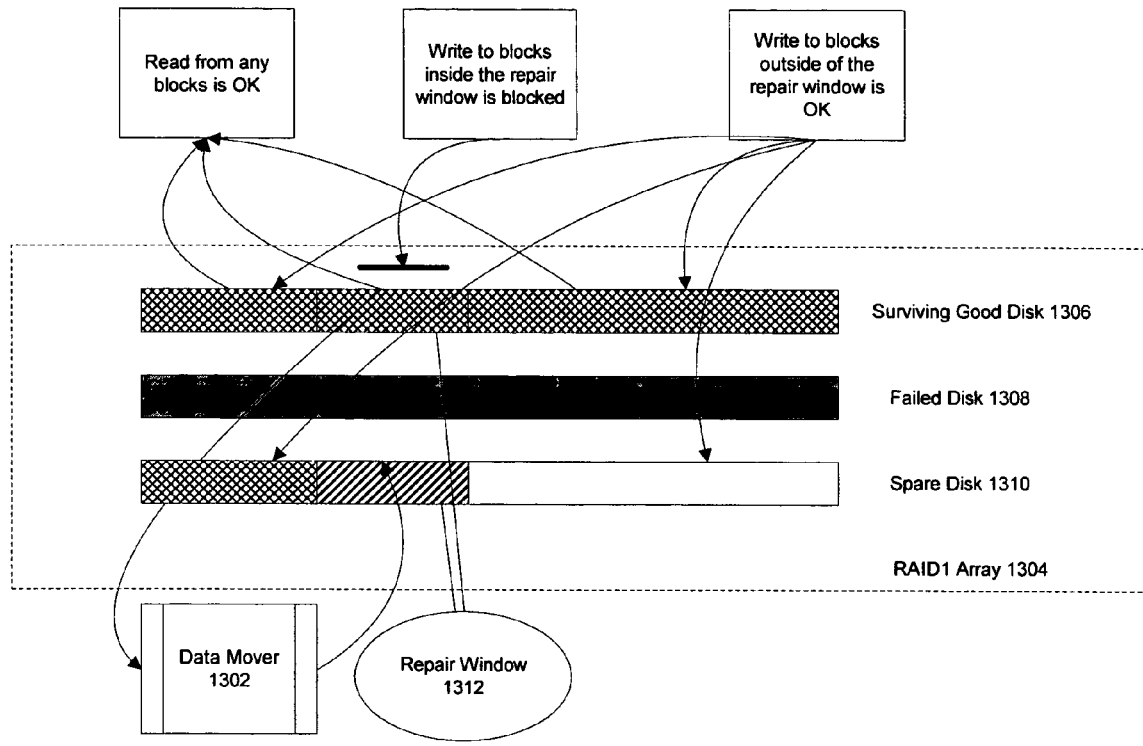
After all data blocks in the current repair window are copied, the repair window is advanced
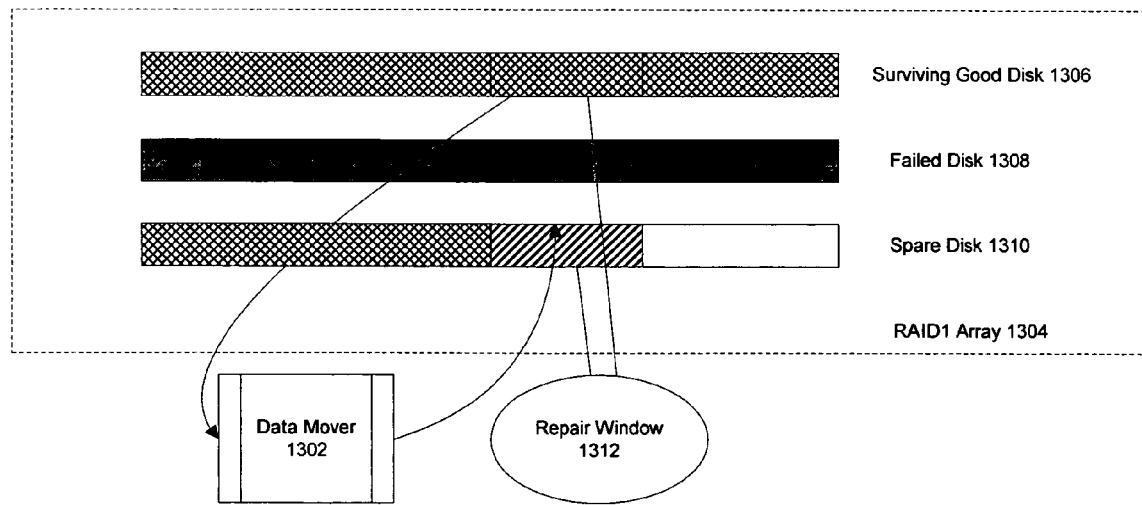
Legends:
 Good data blocks   Data blocks being copied   Data blocks not yet copied
Figure 13. RAID1 Array Repair

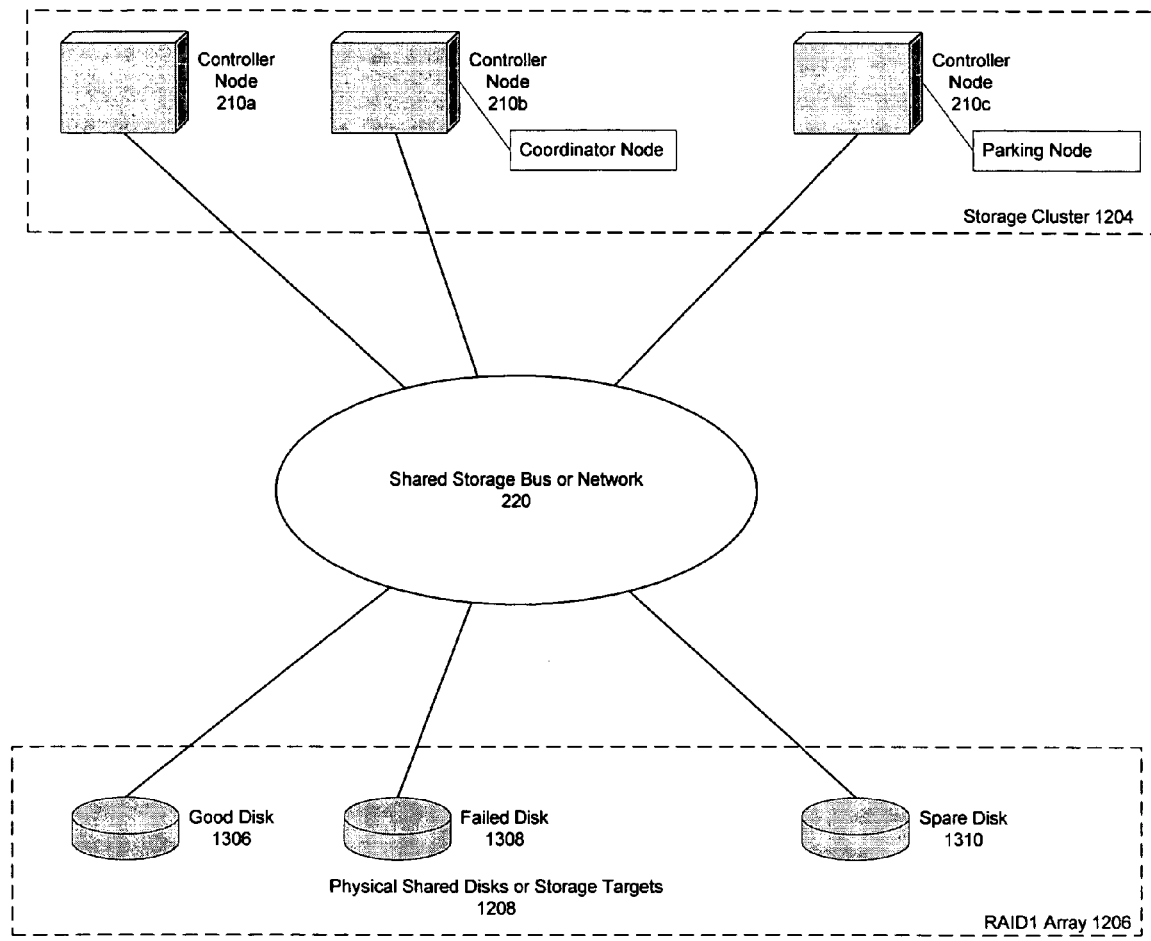
Figure 14. An Example Storage Cluster

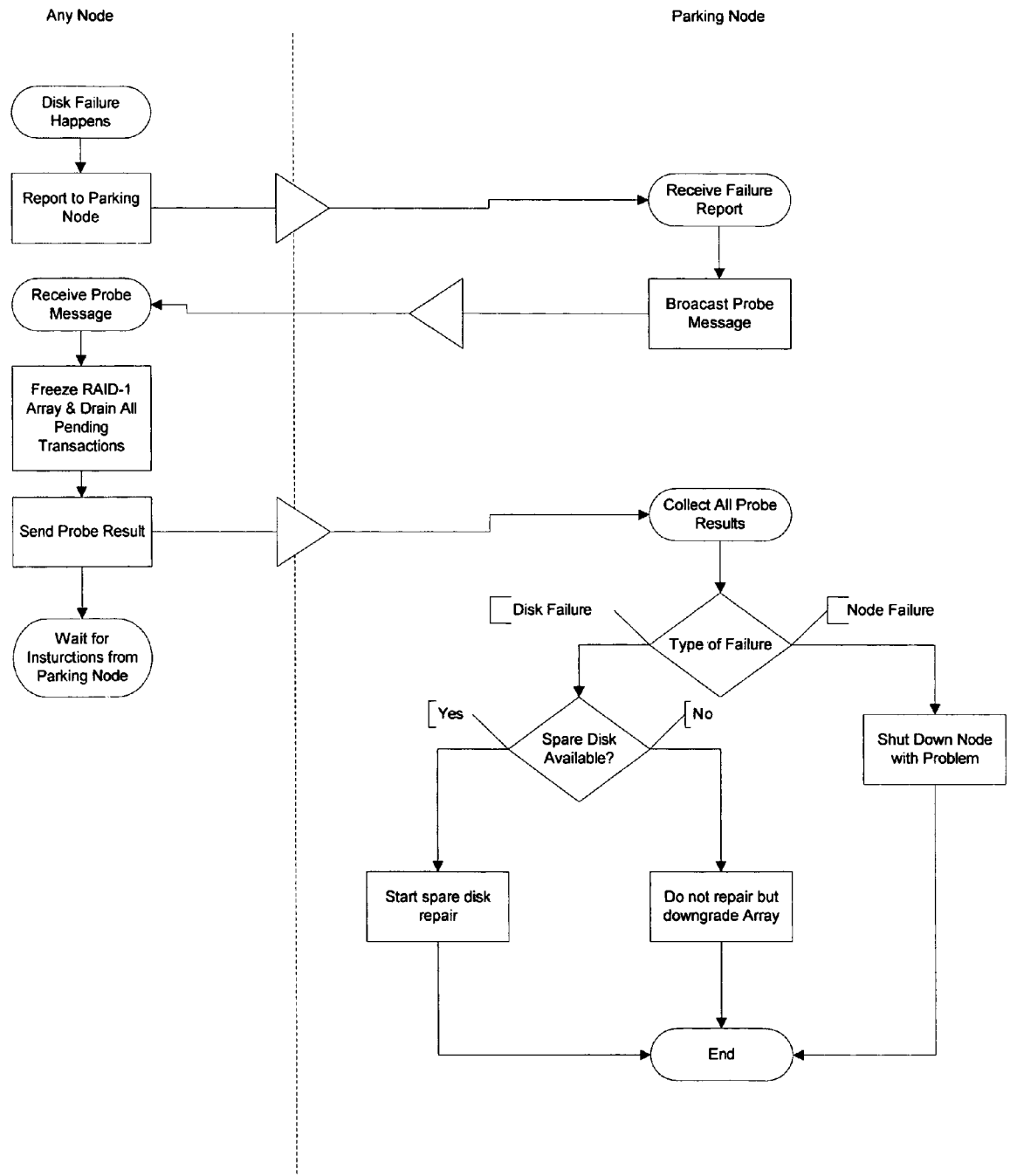
Figure 15. Disk Failure Handling Flow

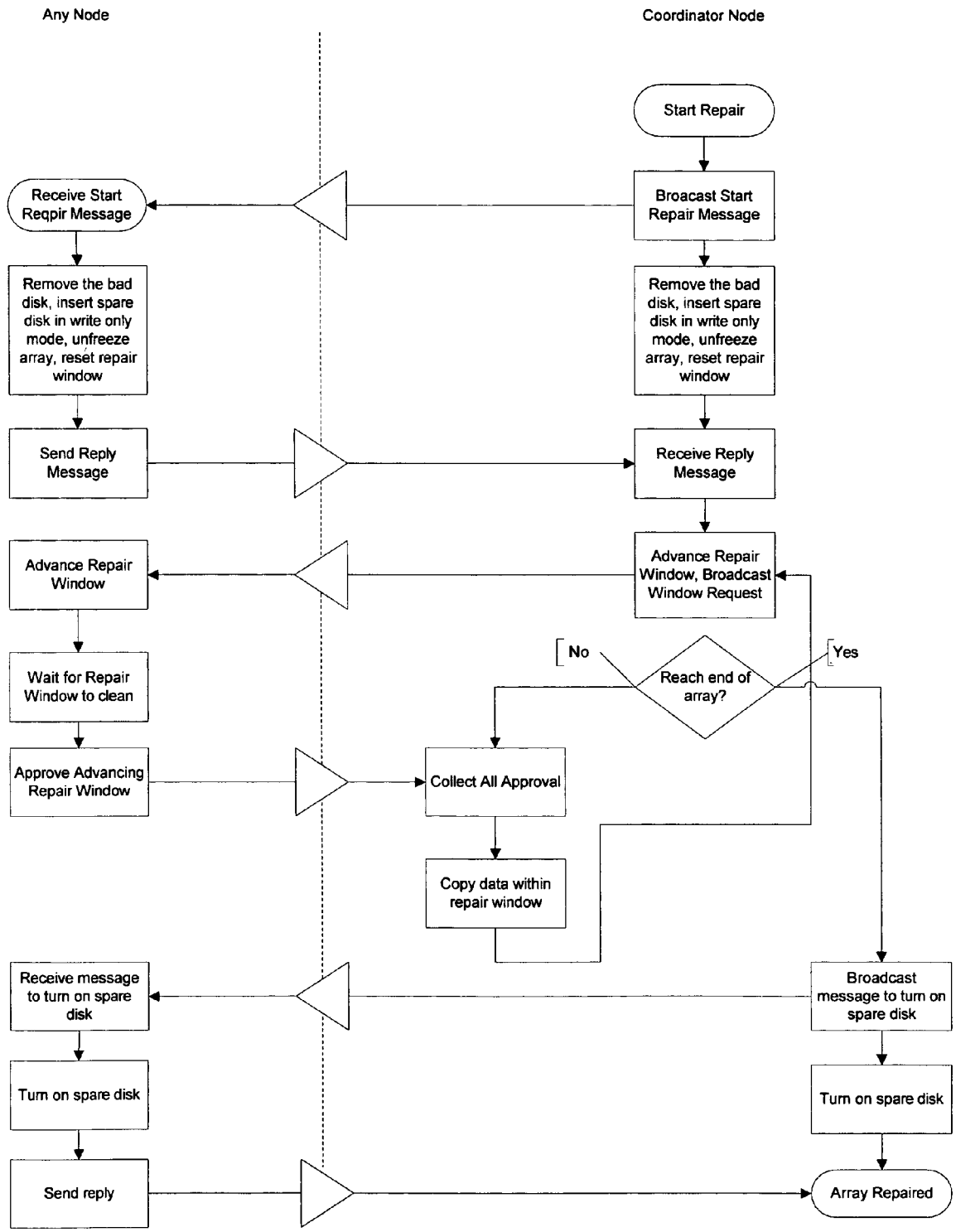
Figure 16. Repair Array with Spare Disks

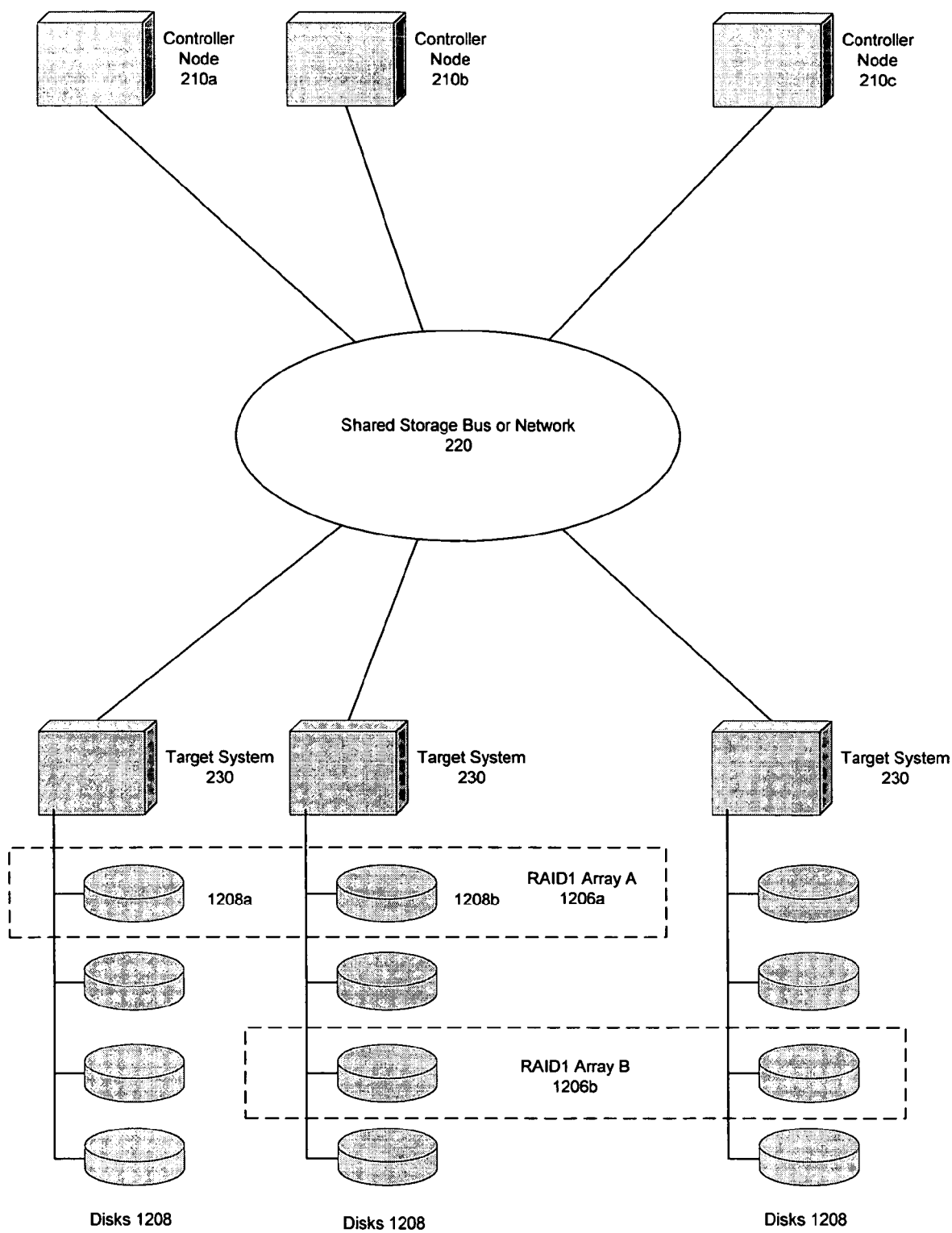
Figure 17. An Example Storage Cluster

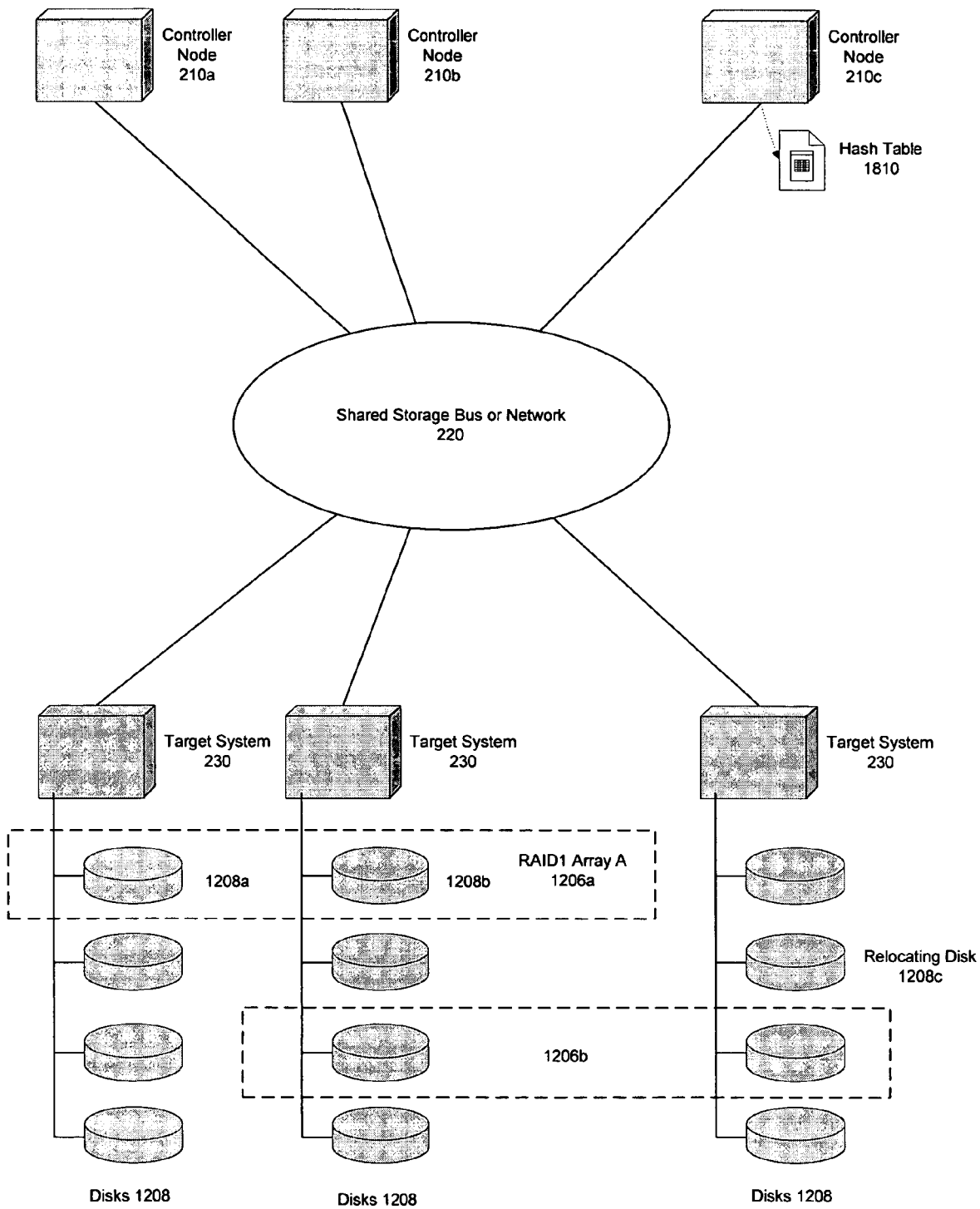
Figure 18. Shadow Mirror

METHOD AND APPARATUS FOR IMPLEMENTING A GRID STORAGE SYSTEM

1 CROSS-REFERENCE TO RELATED APPLICATION

The present application is related to and obtains benefits of provisional patent application entitled "External Intelligent Storage System,", Appl. No. 60/683,692, filed May 23, 2005; provisional patent application entitled "Methods and Apparatus of Performing Storage Functions on Cluster of Storage Controller Computers", Appl. No. 60/688,978, filed Jun. 9, 2005; and provisional patent application entitled "Methods and systems for detecting and handling storage target device failures on a networked storage system", Appl. No. 60/688,932, filed Jun. 9, 2005.

2 BACKGROUND OF THE INVENTION

2.1 Field of the Invention

The present invention relates generally to techniques to implement very large scale distributed intelligent storage systems for computers. More specifically, the present invention relates to a system architecture to build such a storage system which we called grid storage system, and methods to improve performance and fault tolerance of a said grid storage system.

2.2 Description of the Background Art

Presently, there are many external storage systems on the market. Such storage systems provide storage space for user computers to use via network connections. Base on the access protocol, there are 2 major categories for these external storage systems: block level or file system. Block level storages appear to user computer as disks, and usually referred as SAN (Storage Area Network). They are various implementations for SCSI protocol, for example parallel SCSI, fiber channel, or iSCSI, etc. The networked file system storage is usually referred as NAS (Network Attached Storage). SAN and NAS systems are co-exist in the storage market.

FIG. 1 is the architecture of a typical, prior art storage system. This type of storage systems usually consist of many proprietary parts and are thus expensive and do not scale well. Comparing to commodity computer system components such as PCs, Ethernet switches, and ATA or Serial ATA disks, these custom designed storage systems enjoy high performance and better system availability, but with a huge cost disadvantage.

The external storage systems usually contain some intelligence, or virtualization functions. We use the term storage functions to generally refer to these functions, including but not limited to various RAID functions (RAID1, RAID5, etc.), volume manager, snapshot, continuous data protection (CDP), ILM, etc.

3 SUMMARY OF THE INVENTION

One embodiment of the present invention facilitates an architecture to build very large scale intelligent storage system using off-the-shelf commodity components, which we called grid storage system. With extreme cost advantage benefit from the commodity components, the system can achieve very high performance, availability, and scalability.

One embodiment of the present invention facilitates an exemplary method to implement dynamic repairing of disk failures for RAID1 storage coherently across a plurality of loosely coupled storage controller computers (we also use the term nodes for the connected computers) via message communications through network interfaces.

One embodiment of the present invention facilitates an exemplary method to implement snapshot function coherently across a plurality of loosely coupled storage controller nodes via message communications through network interfaces.

One embodiment of the present invention facilitates an exemplary method to detect, tolerate, and repair temporary target device failures in a networked storage system, including but not limited to the said grid storage system. An exemplary target device may contain a plurality of disk devices, and a temporary target device failure may due to many reasons such as a network or software glitch.

4 BRIEF DESCRIPTION OF THE FIGURES

The present invention may be better understood, and its numerous features and advantages made apparent to those skilled in the art by referencing to the accompanying figures.

FIG. 1 is a prior art architecture of a typical intelligent storage system.

FIG. 2 is a logical architecture of an exemplary storage system according to one embodiment of the invention.

FIG. 3 is an exemplary implementation of the present storage system.

FIG. 4 is a logical structure of a controller node, according to one embodiment.

FIG. 5 is an exemplary implementation of the controller node on a Linux operating system.

FIG. 6 illustrates an iSCSI session with two TCP connections to two controller nodes of the exemplary storage system.

FIG. 7 presents a method to handle iSCSI command sequence numbering at multiple controller nodes, according to one embodiment.

FIG. 8 presents an exemplary method to handle SCSI reserve/release command at multiple controller nodes.

FIG. 9 shows how a larger scale storage system can be constructed recursively using the exemplary storage system.

FIG. 10 is an alternative embodiment of a storage system whereby the controller nodes are merged with targets.

FIG. 11 is another embodiment of a storage system whereby the controller nodes are merged with end user computers.

FIG. 12 illustrate an exemplary method in which RAID1 is handled at multiple storage controller nodes through the cluster. Each node has an identical view of the shared storage (disks). RAID1 (mirroring) function is performed identically on each node.

FIG. 13 illustrates a typical RAID1 array repair process for RAID1 running on a single computer.

FIG. 14 illustrates an exemplary embodiment of a simplified storage cluster. This figure is an architectural view of the storage cluster in order to support methods discussed in FIGS. 5 and 6.

FIG. 15 illustrate an exemplary method for reporting and handling disk failures in a RAID1 array on a cluster of controller.

FIG. 16 illustrates an exemplary method to repair a RAID1 array from disk failure with spare disks.

FIG. 17 illustrates an example storage system in which an exemplary method for detecting, tolerating, and repairing target device failure may be practiced.

FIG. 18 illustrates an example storage system in which an exemplary method for shadow mirroring may be practiced.

5 DETAILED DESCRIPTION OF EXEMPLARY EMBODIMENTS

The following is a detailed description of illustrative embodiments of the present invention. As these embodiments of the present invention are described with reference to the aforementioned drawings, various modifications or adaptations of the methods and or specific structures described may become apparent to those skilled in the art. All such modifications, adaptations, or variations that rely upon teachings of the present invention, and through which these teachings have advanced the art, are considered to be within the spirit and scope of the present invention.

5.1 Grid Storage System Architecture

We first present an exemplary architecture to construct large scale intelligent storage systems using off-the-shelf commodity components, which include general purpose computers, switches, and disks. We call such exemplary architecture as grid storage system. The mainstream commodity components have superior performance/price ratio in comparison to the customized proprietary systems. Using the architecture of the present invention, very large high performance storage systems can be built at extreme low cost. The storage systems can also achieve very high availability, scalability, and flexibility.

5.1.1 Overview

FIG. 2 illustrates an exemplary storage system at a very high level. At a boundary, the storage system 200 provides to end user computers 250 a series of storage ports 201. The ports 201 are normally in the form of SCSI transport ports, for example iSCSI ports, although other forms of transport ports are contemplated. Through the ports 201, the end user computers 250 can couple to storage space provided by the storage system 200. A storage image (i.e., view of the storage device) is exactly the same through different ports 201. The ports 201 can be aggregated into multi-path IO (MPIO) for better performance and fail-over. From the end user point of view, this storage system 200 provides the same functionality as a custom built intelligent disk array system having the same storage ports.

Logically, the exemplary storage system 200 comprises three types of components: at least one storage controller node 210, at least one switch 220, and at least one storage target node 230. The exemplary storage controller nodes 210 are general-purpose computers, such as x86 based PC servers. Each storage controller node 210 runs an independent operating system. These storage controller nodes 210 are coupled with each other using networks 221 (e.g., IP-based networks). In exemplary embodiments, all components can be heterogeneous.

The switch 220 and the target nodes 230, in exemplary embodiments, are unchanged commodity components. The switch 220 component may be any off-the-shelf switch or router (e.g., IP based switch or routers). The network 221 can be a high performance LAN such as Gigabit Ethernet, WAN, Internet, etc. The switches 220 couple the controller nodes 210 and target nodes 230. The storage target nodes 230 can be any device that provides one or more shared, network accessible block devices (disks) (e.g., general purpose computers such as PC servers with iSCSI, FC (Fiber Channel), or NBD (network block device), etc.). Although certain numbers of various components are shown in the exemplary embodiment of FIG. 2, alternative embodiments may comprise any number of these components (e.g., controller nodes 210, target node 230, etc.).

FIG. 3 illustrates an example storage system configuration and connection. In the example, gigabit Ethernet switches 302 are used to connect low cost PC servers acting as the controller nodes 110 and target nodes 230 with ATA/SATA disks 304.

5.1.2 Controller Node Structure

A cluster of controller nodes 210 work together to perform intelligent storage functionality. Each controller node 210 may be a regular computer running an independent operating system plus software providing functionalities described herein.

FIG. 4 illustrate an exemplary structure of the controller node 210. Logically, the controller node 210 can be partitioned into three functional parts: north 402, south 404, and heart 406. The north part 402 communicates with the user computers 250 (FIG. 2) and presents a storage target to the user computer 250. The south part 404 communicates with the target nodes 230 to access the disks. The south part 404 may behave as a storage initiator for the target nodes 230. Real storage functions are categorized in the heart 406, which is located in-between the north part 402 and south part 404. The heart 406 comprises a storage intelligence part 408 and a cluster part 410 which glues the storage intelligence part 408 on every controller node 210 work together as a whole. The storage intelligence part 408 may be implemented through various software based storage virtualization techniques.

FIG. 5 illustrates an exemplary implementation of the controller node 210 (FIG. 2). The controller node 210 may be a regular PC running Linux operating system. A data plane is within kernel space, while user space software provides a control plane and a cluster infrastructure.

5.1.3 Controller Node Cluster

Storage functions in the controller node 210 are cluster aware to some degree. The cluster infrastructure provides:

Cluster node membership management (e.g., join/remove nodes)

Metadata management: in an exemplary implementation, the metadata is versioned and replicated on every cluster node Node loss detection and automatic re-construction Reliable multicast/broadcast to cluster nodes The storage intelligence functions rely on the cluster infrastructure to work coherently to provide a single consistent storage image to the end user computers 250.

5.1.4 Single Target Image

The storage controller nodes 210 work together to present to the end user computers 250 a single target image. By single target image, the end user can access the exact same storage through any of the provided ports 201 (FIG. 2). The storage ports 201 are exchangeable with each other and multiple ports can be aggregated together to construct higher throughput storage channels between the end user and the storage system 200.

5.1.4.1 Static Properties

In exemplary embodiments, static properties are pre-defined cluster wide and replicated on every controller node 210. As an example, an identical target name is replicated on every node 210, as are most parameters on an iSCSI layer. In exemplary embodiments, every property is replicated on each controller node 210 in the cluster, unless the property needs dynamic and coherent updates which require additional handling.

5.1.4.2 iSCSI Layer

The iSCSI protocol fully supports multiple TCP connection, and allows fail-over and load balance among the multiple TCP connections. FIG. 6 illustrates an exemplary iSCSI session which comprises multiple TCP connections 602. The iSCSI session couples a user computer 250 to the exemplary storage system 200 on two different controller nodes 210. The two TCP connections will "see" a same target image. It should be noted that any number of controller nodes 210 may be utilized.

1. Command Numbering Background

Quoted from iSCSI spec, "Command numbering is session-wide and is used for ordered command delivery over multiple connections. It can also be used as a mechanism for command flow control over a session". The following summarizes the basic idea of iSCSI command numbering. For a more detailed understanding, please refer to the iSCSI spec.

Both an initiator and a target maintain the following three variables for each session: CmdSN, ExpCmdSN, and MaxCmdSN.

CmdSN is a current command sequence number, advanced by 1 on each command shipped.

ExpCmdSN is a next expected command by the target. The target acknowledges all commands up to, but not including, this number. The initiator treats all commands with a CmdSN less than ExpCmdSN as acknowledged. The target sets the EXPCmdSN to a largest CmdSN that it can deliver for execution plus 1—no holes in a CmdSN sequence.

MaxCmdSN is a maximum number to be shipped. A queuing capacity of a receiving iSCSI layer is MaxCmdSN−ExpCmdSN+1.

In the present storage architecture scenario, the controller nodes 210 are targets while end user computers 250 are initiators. Two exemplary solutions are provided to support iSCSI command numbering under the present storage architecture embodiments of FIG. 6.

2. Solution 1

First of all, simultaneous multiple TCP connections for a session on a single controller node may be restricted. The session may still have multiple connections, but only to a single controller node 210 computer which has multiple network ports. The target side command numbering is handled by a single computer with a single operating system. No additional cluster level coherence is involved; command sequence numbering is handled independently on each controller node 210. For this method, load balance and fail-over can still be achieved between multiple TCP connections within the session, though these TCP connections may be connected to a single controller node 210. In addition, fail-over can be achieved across different controller nodes 210 because the connections do not have to be active at a same time. In summary, only load balancing across different controller nodes 210 is lost by this cheap solution.

3. Solution 2

This solution can support dynamic load balancing across different controller nodes 210, thereby providing true symmetric iSCSI ports to end user computers 250.

FIG. 7 illustrates an exemplary method in which iSCSI command sequence numbering is handled at multiple storage controller nodes 210 through the cluster. A single iSCSI session comprises TCP connections between an end user computer 250 and multiple storage controller nodes 210. Participating controller nodes 702 are the storge controller nodes 210 to which the iSCSI session are connected through the TCP connections. Participating controller nodes 702 implement a virtualized queue 704 and a single iSCSI target image to the initiator through this method. Assuming the virtualized queue 704 size is N, each participate node 702 should have enough memory space to buffer N commands from the initiator.

A queue coordinator node 706 is assigned among the participating controller nodes 702. The present invention is not limited to specific rule on selecting the coordinator node 702. The controller node 702 may be assigned by an underlining cluster infrastructure, which may pick the node 702 based on workload, for example.

Each controller node 210, including the coordinator node 706, maintains a local window of CmdSNs. The local window holds un-acknowledged CmdSNs from a local node's point of view.

Upon receiving a new command from the initiator, every participating controller node 702 sends a message 708 to the coordinator node 706 to report the received CmdSN. The message 708 comprises ordering information, for example, a task management command.

Upon receiving the message 708 from the participating nodes 702, the coordinator node 706 will update its local window. In one embodiment, the holes in the window are filled, and the maximum CmdSN is advanced before which no holes exist. This CmdSN is Ack_CmdSN. Once the Ack_CmdSN is changed in the coordinator node 706, the node 706 multicasts its Ack_CmdSN with a multicast message 710 to all participate nodes 702.

Each participating node 702 can acknowledge any command that has a CmdSN smaller than a local Ack_CmdSN. Each node 702 has two ways to advance its local Ack_CmdSN: 1) if the node 702 receives the message 710 from the coordinator 706 with an Ack_CmdSN>its local Ack_CmdSN, the node 702 updates its local Ack_CmdSN equal to the one from the message 204. 2) if there is no hole between current Ack_CmdSn and a bigger CmdSN=X, increase Ack_CmdSN to X. As an example, assume a node 702 receives command 5,6,7,8,9, and the current Ack_CmdSN=2. This means there are holes for 3,4 for this node 702. When the message 710 is received from the coordinator 706 with Ack_CmdSN=5, this node 702 can immediately updates its local Ack_CmdSN to 9, and acknowledge all the commands.

When the node 702 acknowledges to the initiator, the MaxCmdSN=ExpCmdSN+N−1, where N is the virtualized queue size. In exemplary embodiments, the queue 704 is distributed across the controller nodes 210, where each controller node 210 should have enough space to hold all N commands.

The coordinator node 706 is responsible for maintaining timeout for the holes, and sends retry request to the initiator in case of timeout. In case the coordinator node 706 is down, the cluster will detect the node loss and a new coordinator node 706 will be assigned from the remaining, active controller nodes 210.

Further performance optimization opportunities exist on top of this method. As an example, a read command can be executed before the command is ready to acknowledge. However, data cannot be returned to the initiator until the command's CmdSN is ready to be acknowledged, which means CmdSN<Ack_CmdSN in our method.

5.1.4.3 SCSI Layer

At SCSI layer, reserve/release functionality requires cluster synchronization among the controller nodes 210.

Reserve/release is a group of SCSI commands to reserve and/or release a logical unit or an extent within a logical unit for the exclusive or shared use of a particular initiator.

One exemplary low-cost solution is to not support reserve/release functionality. Although this is a simple and viable solution, it drastically reduces value of the storage system 200 (FIG. 2). There is some cluster software (on end user computers 250) that requires the shared storage to support reserve/release functionalities. Those cluster software (which may run on the end user computers 250) cannot use the present storage system 200 if reserve/release is not supported, according to exemplary embodiments.

To support reserve/release commands, an exemplary distributed method similar to the way iSCSI command numbering is performed is provided in FIG. 8. Among the participating controller nodes 210, a coordinator node 802 is assigned. The present invention does not limit the rule on selection. As an example, the selection can be based on workload on participate controller nodes 210. A node 210 will become participating if any commands from its north part ports 402 (FIG. 4) access a storage address space that a reserve/release data structure is associated with. Otherwise, if a node 210 never accesses an interested address space, it is not a participating node. The granularity of the data structure 804 is up to the implementation. For example, a reserve/release data structure and associated coordinator can be assigned for a LUN (Logic Unit Number), a group of LUN, or a portion of a LUN, etc. Alternatively, the implementation may select a single coordinator node to handle reserve/release system wide.

Reserve/release data structure 804 is replicated on every controller node 210 in the cluster. It is checked in the data plane for any command (read/write commands, for example) accessing the related address space. A return value is generated locally and returned to the initiator.

Upon receiving a release/reserve command, the controller node 210 sends a message to the coordinator node 802 with at least one request 806. The requests 806 are queued at the coordinator node 802 and processed in serial, in exemplary embodiments. After the coordinator 802 processes the request 806, the new reserve/release data structure 804 is broadcasted to all controller nodes 210. After receiving a broadcast 808, each controller node 210 may update its local data structure 804 persistently. If its request 806 is shown processed in the received broadcast message 808, the controller node 210 will, in exemplary embodiments, complete the reserve/release command to initiator.

In case the coordinator node 802 is down, a new coordinator node 802 will be assigned, and all participate nodes 210 will resend requests 806 to the new coordinator node 802.

According to one embodiment, the system may be optimized by, instead of the coordinator node 802 broadcasting update message 808 to all cluster controller nodes 210, the coordinator node 802 may only multicast to participate nodes 210. This optimized method requires:

Non-participating nodes are prevented from accessing the related address space until they becomes participate nodes; and/or Although it is not required to synchronously update data structure 804 on non-participating nodes, the data structure 804 should be propagated, in one embodiment, to all (cluster) controller nodes 210 asynchronously to make the nodes 210 consistent across all nodes 210. This can be done by periodic broadcasting from the coordinator node 802.

5.1.5 Single Initiator Image

In addition to presenting to end user computers 250 as a single target image, the controller nodes 210 present a consistent view to the target nodes and disks to which they are coupled. This consistent view is termed single initiator image.

In exemplary embodiments, the initiator image is controlled by the cluster, replicated, and stored as metadata files in each controller node 210. Whenever the initiator image is changed (for example adding or removing a target node or disk, or a disk failure), the change is broadcasted to all controller nodes 210, and metadata files are updated accordingly.

5.1.6 Dynamic Scaling

One important feature of the present architecture is dynamic scaling. The loosely coupled cluster architecture enables adding/removing storage controllers on-the-fly. By careful engineering, all components can be dynamically added/removed while the system is running. This includes the switch components, target node components, and disks within target nodes.

5.1.7 Incremental System Upgrade

Enabled by dynamic scaling of the architecture, incremental upgrade of the storage system may be achieved. While the system is running normally, incremental patching or updating can happen on-the-fly. For example, shutting down a node 210 and/or 230 to patch or upgrade is just like a temporary node failure, which can be gracefully handled by the cluster. After the node 210 and/or 230 is updated, it can re-join the cluster. All nodes 210 and/or 230 can be updated one by one using this manner. The whole storage system does not need to be offline in order to update the storage system.

5.1.8 Recursive Construction

FIG. 9 illustrates an exemplary storage system 900 which is constructed recursively using the present architecture. The top-level storage system 900, in this embodiment, uses another storage system 910 with the present architecture as its target node 230. The architecture enables recursive construction because:

the system provides standard storage ports to end users, and behaves as a standard target device; and the system utilizes the standard target device as its building block to construct larger systems.

5.1.9 Other Variations

Three exemplary alternative embodiments of the present architecture are provided below. The alternative embodiments can be mixed. For example, controller nodes can be merged with the target nodes, and running file system software on top of the merged nodes.

5.1.9.1 Controller Merged with Target

FIG. 10 illustrates an embodiment in which the storage controller nodes 210 are merged with the target nodes 230 physically on the same computer. Logically, the storage controller layer is independent with target functionality. It is the hardware computer that is merged.

Thus, the controller logic is included together with the target disks in a physical computer box. A bigger system can then be constructed by connecting these computer boxes together. The bigger system provides both more disk space and more controller logic.

5.1.9.2 Controller Merged with End User Computer

FIG. 11 illustrates an embodiment in which the storage controller nodes 210 are merged with the end user computers 250. Physically, the controller 210 and end user applications 1102 share the hardware computer, with independent software components. The single target image requirement, however, can be relaxed in this embodiment. For example, the iSCSI and SCSI layer is no longer needed in north part 402.

5.2 RAID1 and Dynamic Repair of Disk Failures

Software implementation of various storage functions such as RAID and volume manager, are available for single computers in prior art. Embodiments of the present invention provide methods to perform these storage functions coherently across a loosely coupled cluster of computers or computing devices, include but not limited to the controller nodes in said grid storage system architecture.

Two exemplary methods for storage functions are provided herein: (1) RAID1 and dynamic repair for failed disks, and (2) snapshot. In further embodiments, similar approaches can be applied to many other storage functions. In this section of description, a RAID1 method is described in excessive detail so that the following method for snapshot can reference some common procedures.

The exemplary scenarios comprise some or all of the following general assumptions. 1) Storage functions are running on independent computers (or nodes) coupled through networks. 2) All nodes have identical views of the coupled shared disks. 3) An identical copy of an indicated storage function module 102 is running independently on each node. 4) A cluster infrastructure couples the nodes, providing services such as membership, broadcast/multicast, etc.

5.2.1 RAID 1 Normal Function (Mirroring)

FIG. 12 illustrates an exemplary method wherein RAID1 is handled at multiple storage controller nodes 210 through a cluster 1204. Each controller node 210 has an identical view 1206 of the shared storage (disks) 1208. RAID1 (mirroring) function is performed identically on each controller node 210.

5.2.2 Single Node RAID1 Dynamic Disk Failure Repair

As illustrated in FIG. 13, for a single controller computer, a typical disk repair sequence is as follows: (1) disk access fails; (2) failed disk 1308 is taken off and a spare disk 1310 is inserted and marked as write only; (3) a data mover 1302 copies data from surviving good disk(s) 1306 in the RAID1 array to newly added spare disk(s), and synchronization is usually performed through a repair window 1312 which is explained in more detail below; (4) after the data is copied, spare disk(s) are turned on as normal mirror disk(s), and the repair is finished.

The exemplary repair window 1312 is a range of addresses used to prevent an unexpected data write when copying data from a good disk to spare disk. The data mover only copies data within the repair window, while normal data writes inside the window are blocked. The window will be advanced and repeat the process after the entire window is copied.

5.2.3 Coherent Multi-Node RAID1 Dynamic Disk Failure Repair

For simplicity of discussion, FIG. 14 illustrates an exemplary embodiment of a simplified storage cluster. FIG. 15 illustrates an exemplary method for reporting and handling disk failures in a RAID1 array on such a cluster 1204 of controller nodes 210. According to an exemplary embodiment, one controller node is known to all remaining clustered controller nodes as a parking node 210c. The parking node is also one of the clustered controller nodes.

In an example, a disk access failure happens on any one of the controller nodes. The controller node will then send a message to the parking node 210c to report the failure.

Upon receiving a failure report message, the parking node broadcasts a probe message to all clustered controller nodes.

Upon receiving the probe message from the parking node, each controller node in the cluster will freeze the indicated RAID1 and drain all pending transactions. The controller nodes also probe all the disks 1208 within the indicated RAID1 array 1206. After the transactions are drained, a PROBE_ACK message is replied to the parking node in response to the original probe message. Partial write transactions are recorded and returned to the parking node with the reply message.

Upon receiving all PROBE_ACK reply messages for the indicated RAID1, the parking node will first merge the partial writes into a single data structure. And the parking node will analyze the aggregated probe results for the indicated RAID1 disks. There are several possibilities including, but not limited to,: (1) one or more disks fail on all controller nodes (2) one or more controller nodes have problems accessing the disks while other controller nodes work fine in accessing the same disks. Based on the possibility and the available resources, several actions are possible: (1) if spare disks are available, proceed to repair the bad disks with spare disks; (2) if no spare disks are available, do not repair and the RAID1 array will continue to operate with reduced data redundancy coverage; (3) shut down the controller node or nodes having problems, the storage system will continue operate with less controller nodes. Each possible action will be discussed in more detail below.

1) Spare Disk Repair

FIG. 16 illustrates an exemplary procedure to repair bad disks by using spare disks. After the analysis and the decision to repair the bad disks with spare disks is made (in accordance with FIG. 15), the parking node 210c selects a coordinator node 210b among the clustered controller nodes 210. According to one embodiment, there are no specific rules oh selecting the coordinator node. The coordinator node may be picked based on workload, for example. Any controller node, including the parking node may be selected as the coordinator node. A message is broadcasted to all clustered controller nodes 210 by the parking node 210c. Besides the indicated RAID1, the message includes identification of the coordinator node, the bad disks, and the spare disks, and an action code to repair the bad disks using the spare disks.

Upon receiving the message, each controller node will update a local data structure. If the controller node is the coordinator node, it will start the repair process. The coordinator node broadcasts a message to all clustered controller nodes. The message comprises an action sequence (e.g., take off the bad disks, insert spare disks with write only attributes, unfreeze the RAID1, reset the repair window).

Upon receiving the message, each controller node will execute the action sequence (e.g., take off bad disks, insert spare disks, unfreeze, and reset repair window). After executing the action sequence, a reply message is sent back to the coordinator node.

After the coordinator node collects all the reply messages, the coordinator node will start a repair window movement for data repair. The data repair is performed by repeating the following exemplary process until the repair window reaches the end: (1) the coordinator node advances the repair window, i.e., increases the related addresses for the address range, and broadcasts the window request to all controller nodes; (2) each controller node advances its local repair window upon receiving the broadcasted message, and after the newly advanced window is cleared (no pending accesses), the controller node sends a window approve reply message to the coordinator node; (3) after the coordinator node receives all window approval messages from all controller nodes, the coordinator node issues a read and then write access command to copy data from good disks to spare disks for every address within the repair window. After all data in the window are copied, the coordinator node advances the repair window and repeats the process.

After the coordinator node finishes the window movement, i.e., the address reaches the end of the RAID1 so that all data are moved, the coordinator node broadcasts a message to all clustered controller nodes with an action sequence to turn on all the spare disks.

Upon receiving the message with the new action sequence, each controller node turns the repaired spare disk into normal working disks of the indicated RAID1 disk array, and sends a reply message back to coordinator node.

After the coordinator node receives all reply messages from the clustered controller nodes, the coordinator node completes the repair for the RAID1, and sends a message to the parking node to report successful repair.

Upon receiving the report message, the parking node broadcasts a message to all clustered controller nodes so that every controller node is informed the repair is committed to be finished, and the coordinator node role is retired for the coordinator node.

2) No Spare Disk Available

The parking node broadcasts a message to all clustered controller nodes with an action sequence to take the bad disks off from the indicated RAID1 and unfreeze the RAID1.

Upon receiving the broadcasted message, each controller node will execute the action sequence, and send a reply message to the parking node.

The parking node receives all reply messages and commits to finish the action (i.e., taking off the failed disk from the RAID1 array and continue to operate with reduced data redundancy) on the indicated RAID1.

3) Shut Down the Controller Node with Problem

The parking node informs the cluster infrastructure to shut down the controller node with problems, and then unfreezes the indicated RAID1 for the remaining cluster nodes. The storage system will continue to operate with less controller nodes.

5.3 Coherent Multi-Node Snapshot Method

Snapshot is normally available as a sub-function of a volume manager. It is used for data backup. While a volume is performing its regular function, one or more snapshots can be created for backup software to move the data to a backup device, which is typically a tape drive or another disk array. In the present clustered scenario, the snapshot requires dynamic synchronization among the cluster nodes, while most other volume manager functionality does not need heavy cluster involvement.

5.3.1 Asymmetric Snapshot

The advantage of this method is that it is simple and efficient. A potential disadvantage is that the snapshot may be accessible only from one particular node, according to some embodiments.

For the asymmetric snapshot method, the snapshot is created and accessible from one node, called a snapshot owner node. The owner node can be decided by user since the backup device will access the snapshot through the owner node. The owner node owns the snapshot and contains all necessary data structure to access the snapshot. In exemplary embodiments, the snapshot volume can only be accessed through the owner node. None of the other (controller) nodes have the knowledge of the snapshot volume; the original volume is not affected.

On each node, including the owner node, the original volume is in a special watch mode. In the watch mode, read access is normal while write access has to get permission from the owner node. For every write transaction, the (re-questor) node sends a message to the owner node asking for permission.

Upon receiving the message, the owner node checks the address in its local hash table. If it hits in the hash table, the permission is granted immediately and a reply message is sent. Otherwise if it misses in the hash table, a read access is schedule to the same address in the original volume. After the read data is returned, the write permission is granted and a reply message is sent. The read data is written to a local persistent storage, and a new hash table entry is allocated for the address with a mapping to the location where the original data is written.

The snapshot volume is read only from the owner node. The read access will check the hash table first. If it hits the hash table, the data is read from local storage according to the address given in the hash table entry. Otherwise if it misses, data is read from the original volume.

5.3.2 Make the Snapshot Accessible from Every Node

In a further embodiment, the asymmetric snapshot can be assessable from every controller node. The relocated data, as well as the hash table, can be located in shared storage. In this embodiment, if the owner node is down, another owner node can be assigned and the snapshot survives from a loss of the owner node. This further embodiment makes the snapshot accessible from every controller node; while still keeping the simplicity of handling the snapshot within a single node.

5.4 Tolerating Temporary Target Device Failure

A target device may temporarily fail due to many reasons such as a network or software glitch. An exemplary target device may contain a plurality of disk devices.

One embodiment of the present invention facilitates an exemplary method to detect, tolerate, and repair temporary target device failures in a networked storage system, include but not limited to the said grid storage system The exemplary scenarios comprise some or all of the following general assumptions. 1) Storage functions are running on independent computers (or nodes) coupled through networks. 2) All nodes have identical views of the coupled shared disks. 3) An identical copy of an indicated storage function module 102 is running independently on each node. 4) A cluster infrastructure couples the nodes, providing services such as membership, broadcast/multicast, etc.

5.4.1.1 Target Device Failure Detection

FIG. 17 illustrates an example system for target device failure detection. According to this example, three clustered storage controller nodes 210 and three targets 230 having, or coupled to, a plurality of disks 1208 (e.g., 4 disks) are provided. Two RAID1 systems 1206a and 1206b exist in the example system. In alternative examples, any number of controller nodes 210, targets 230, disks 1208, and RAID systems 1206 may be coupled together to form the storage system.

Typically, disks have relatively low MTBF (mean time between failure), and are subject to failures. The various RAID systems are used to tolerate disk failures. For example in FIG. 17, each RAID1 has two disk mirrors or copies (e.g., RAID1 array A 1206a has mirrored disk 1208a and 1208b). If one of the mirrored disks (e.g., 1208a) fails, a second mirror disk (e.g., 1208b) can still service the data access. A repair procedure can then be initiated by inserting a spare disk into the RAID1 system (e.g., 1206) and re-synching the data after the failed disk(s) recovers. The re-synching process will be discussed in more detail in connection with FIG. 18. After the repair, the RAID1 system (e.g., 1206) still has two data copies (e.g., 1208a and 1208b) and the redundancy coverage is not reduced.

The target device 230 is subject to failure as well. For example, software or hardware may have temporary glitches.

Alternatively, network 220, which connects the target device 230 to the controller nodes 210, may be lost temporarily. Network loss will have a higher probability of occurring when the connection network is converging to IP-based interconnects, for example using iSCSI. These failures have some common characteristics: 1) all these failures are not really disk failures. The data is not lost. 2) And the failures are very likely temporary. By simply re-booting the target device 304, or resetting or re-connecting a network switch, the target device 304 can be brought back to service again. The disks 1208 can come back as well after the temporary loss.

A target device failure will normally bring down multiple disks at the same time. Although it is not an optimal solution, it is valid to treat the target device failure as individual disk failures and rely on the RAID system to tolerate and repair the disk failures. However, having a separate method to handle the target device failure can largely improve the storage system performance.

Detect. When a shared disk access fails, the failure is reported to a particular node (e.g., 210a), which is called a parking node. The parking node 210a will broadcast a probe message to all cluster node (e.g., 210b and 210c) for all the disks on the same target device 230. After receiving the message, each node 210b and 210c will probe the shared disks and return probe results back to the parking node 210a. As an example, the probe can be a dummy read command to the shared disk, or/and some other SCSI commands sent to the target device.

Mark. The parking node 210a collects probe results from all the clustered storage controller nodes 210b and 210c. If all the disks 1208 on the same target device 230 fail at the same time and the target device fail to execute SCSI or iSCSI commands, it will be treated as a target device failure, and all the involved disks 306 are marked as temporarily unavailable.

5.4.1.2 Shadow Mirror

The disks in the RAID1 which are temporary unavailable are treated using a technique called "shadow mirror." Instead of removing the failed disks, which reduces the level of data redundancy, the shadow mirror technique will make the failed disks logically write-only copies, record all following write transactions and write data onto a separate safe location (as described in more detail below), and finally merge the data from the safe location with the original disks after the failed disks recover. Therefore, although the shadow mirror disk is not on-line for data service until the temporary loss disk recovers, the data redundancy coverage is not reduced.

All disks inside the down target device are marked as temporarily unavailable. The temporarily unavailable disk of the RAID1 is marked as a shadow mirror disk on all controller nodes, and a coordinator node is assigned for the shadow mirror disk. The shadow mirror disk is write-only logically, although the physical disk is indeed failed (i.e. unavailable for read/write accesses). The coordinator node will allocate a shared storage area on a separate, good (i.e., non-failed) disk for relocating write data following the disk(s) failure.

Upon receiving a write transaction to the shadow mirror disk, the controller node will send a message to the coordinator node, asking for approval/permission.

Upon receiving the message, the coordinator node will check its local hash table. If the write address matches an entry in the hash table, the matched entry will give an address on the relocating storage area (i.e., the good disk). Otherwise if there is no match, a new hash table entry will be allocated and filled with an address of new allocated space on the relocating storage area. The coordinator node will reply with an approval message with the address on the relocating storage area.

Upon receiving the message, the requesting node will write the data into the given relocate address, and finish the write.

If the coordinator node fails during the shadow mirror procedure, the shadow mirror can simply fail, and a regular spare disk repair procedure can be initiated.

5.4.1.3 Re-Join

After the target device recovers, all the temporarily unavailable disks are recovered. A re-join procedure will merge the data in the good disk location with the recovered disk, and put the recovered disks back on-line in the RAID1.

The recovered disk is marked as re-join on all controller nodes. It is still, however, write-only, and handled in a similar manner as the regular shadow mirror disk with some minor differences, i.e. no new hash table entry will be allocated on write transactions. Upon receiving a write transaction on the re-joining disk, the controller node will send a message to the coordinator node, asking for approval/permission.

Upon receiving the message, the coordinator node will check the hash table. A relocated storage address is returned if there is a match in the hash table. However, no new hash table entry will be allocated if there is no match. In exemplary embodiments, the approval message will be sent back immediately.

Upon receiving the message, the requesting node will write the data into the shadow mirror disk, which includes the re-joining original disk and the relocating storage area. The data will be written into the re-joining original disk, and the relocating storage area if a relocate address is returned with the message. If no address is returned, only the re-joining original disk is written to.

The coordinator node synchronizes the data for the re-joining disk. It copies data from any good mirror disks to the re-joining disk. The source of the copying can be any of the working mirror disks, or the shadow mirror disk, itself, from the relocate storage. Not the entire disk space is required to synchronize for the re-joining disk, but only the addresses on the hash table are needed. The re-sync is no more different than a said spare disk repair disclosed earlier, with only a small subset of the addresses on the hash table actually required for physical data movement.

After the re-joining disk is synched up with all the mirror disks, the coordinator node will free the hash table and the associated relocate storage area. The re-join disk returns to normal on all clustered storage controller nodes. Following reads or writes on the re-joined disk will be served locally on each node, without the coordinator node involvement. Indeed, the coordinator node will retire from the coordinator role after the disk is successfully re-joined.

The invention has been described above with reference to exemplary embodiments. It may be apparent to those skilled in the area that various modifications may be made and other embodiments can be used without departing from the broader scope of the invention. Therefore, these and other variations upon the specific embodiments are intended to be covered by the present invention.

REFERENCES

"External Intelligent Storage System,", provisional patent Appl. No. 60/683,692, filed May 23, 2005;

"Methods and Apparatus of Performing Storage Functions on Cluster of Storage Controller Computers", provisional patent Appl. No. 60/688,978, filed Jun. 9, 2005;

"Methods and systems for detecting and handling storage target device failures on a networked storage system", provisional patent Appl. No. 60/688,932, filed Jun. 9, 2005.

Tom Clark, "Designing Storage Area Networks: A Practical Reference for Implementing Fibre Channel and IP SANs", Second Edition, Addison-Wesley Professional; 2 edition 2003.

Thomas Clark, Tom Clark , "IP SANS: An Introduction to iSCSI, iFCP, and FCIP Protocols for Storage Area Networks", Addison-Wesley Professional; 1st edition, 2001

Tom Clark , "Storage Virtualization: Technologies for Simplifying Data Storage and Management", Addison-Wesley Professional , 2005

Huseyin Simitci, "Storage Network Performance Analysis", Wiley; 1st edition, 2003.

John L. Hufferd, "iSCSI: The Universal Storage Connection", Addison-Wesley Professional; 1st edition, 2002

Marc Farley, "Storage Networking Fundamentals: An Introduction to Storage Devices, Subsystems, Applications, Management, and File Systems", (Cisco Press Fundamentals) Cisco Press, 2004

The invention claimed is:

1. A method for replacing a failed disk with a spare disk in a networked storage system including but not limited to a grid storage system with a plurality of said controller nodes, comprising:

providing a pool of spare disks in the storage grid storage system;

providing message exchange protocols among the said storage controller nodes, wherein the said protocols communicate among the said storage controller nodes so that all said nodes are in synchronization on some desired state;

providing pre-defined message exchanging sequence among the said nodes, the said sequence will be triggered when the said disk failure happens until the replacing process is complete, wherein the sequence is synchronized among all said controller nodes via the said protocols;

providing a repair window synchronized among all said storage controller nodes to guarantee data access hazard will not happen while moving data within the said repair window, wherein the said repair window is communicated among the said controller nodes via the said message exchange protocols, the said window is advanced via the said message exchanging sequence until the said data movement is complete;

providing a coordinator role to one of the said controller nodes, wherein the said coordinator node initiates and make decisions for the said message exchanging sequence to all said controller nodes, and is responsible to write critical data before the said data can be observed by other controller nodes;

whereby the said replacing of failed disk will not interrupt regular storage access function at any time, and storage accesses can be processed by any of the said storage controller node with correct data, the level of redundant protection for the data on the said failed disk will be recovered after the said replacing is complete.

2. The method of claim 1 wherein the said message exchange sequence comprising:

detecting a disk failure on a target node;

replacing the said failed disk with at least one spare disk;

moving data from remaining good disks for the redundant data to the spare disk;

converting the said spare disk into a working good disk after the said data moving is complete.

3. The method of claim 1, wherein the said coordinator node is a role which can be assigned to any node, not bound to any specific node; and the said coordinator can be re-assigned if the said coordinator node is detected failed via the said message protocol.

* * * * *